United States Patent
Nakajima et al.

(10) Patent No.: US 7,228,482 B2
(45) Date of Patent: Jun. 5, 2007

(54) COMMUNICATION SYSTEM, COMMUNICATION CONTROL METHOD, AND PROGRAM FOR IMPLEMENTING THE METHOD

(75) Inventors: Yoshiyuki Nakajima, Ibaraki (JP); Takeshi Sekiya, Ibaraki (JP); Shigeru Sugita, Saitama (JP)

(73) Assignee: Canon Kabushiki Kaisha (JP)

( * ) Notice: Subject to any disclaimer, the term of this patent is extended or adjusted under 35 U.S.C. 154(b) by 590 days.

(21) Appl. No.: 10/793,020

(22) Filed: Mar. 4, 2004

(65) Prior Publication Data
US 2004/0177170 A1   Sep. 9, 2004

(30) Foreign Application Priority Data

Mar. 6, 2003 (JP) .............................. 2003-060481
Mar. 6, 2003 (JP) .............................. 2003-060482

(51) Int. Cl.
*H04L 1/14* (2006.01)
*G08C 25/02* (2006.01)

(52) U.S. Cl. .................................................. 714/750
(58) Field of Classification Search ................ 714/748, 714/750
See application file for complete search history.

(56) References Cited

U.S. PATENT DOCUMENTS

| | | | | |
|---|---|---|---|---|
| 4,720,784 A | * | 1/1988 | Radhakrishnan et al. ... | 710/107 |
| 5,533,034 A | * | 7/1996 | Kuwata et al. ............. | 714/748 |
| 5,875,202 A | * | 2/1999 | Venters et al. ............. | 714/807 |
| 6,357,033 B1 | * | 3/2002 | Jippo ........................ | 714/758 |

FOREIGN PATENT DOCUMENTS

| | | |
|---|---|---|
| JP | 2-37438 A | 2/1990 |
| JP | 7-276743 A | 10/1995 |
| JP | 11-143842 A | 5/1999 |
| JP | 2000-244689 A | 9/2000 |

* cited by examiner

*Primary Examiner*—Shelly Chase
(74) *Attorney, Agent, or Firm*—Rossi, Kimms & McDowell LLP

(57) ABSTRACT

A communication system that can quickly perform the processing of the data re-transmission when error occurs in the data. The communication system includes an automatic original feeder and an image reader that transmit and receive data simultaneously. A CPU provided in the automatic original feeder determines error of reception data. The CPU adds the result of the determination to transmission data being transmitted to the image reader. One of the automatic original feeder and the image reader acts as a slave, and the other acts as a master.

21 Claims, 15 Drawing Sheets

FIG. 4

| 1byte | 2byte | 3byte | 4byte | 5byte | 6byte | 7byte |
|---|---|---|---|---|---|---|
| OUT1 | OUT2 | PWM_ON | PWM1H | PWM1L | PWM2H | PWM2L |

| 8byte | 9byte | 10byte | 11byte | 12byte | 13byte |
|---|---|---|---|---|---|
| DA1 | DA2 | MTR_ON | MTR_DIR | Parity | SUM |

FIG. 5

| 1byte | 2byte | 3byte | 4byte | 5byte | 6byte | 7byte |
|---|---|---|---|---|---|---|
| OUT1 | OUT2 | PWM_ON | PWM1H | PWM1L | PWM2H | PWM2L |

| 8byte | 9byte | 10byte | 11byte | 12byte | 13byte | 14byte |
|---|---|---|---|---|---|---|
| DA1 | DA2 | MTR_ON | MTR_DIR | IN1 | IN2 | AD1 |

| 15byte | 16byte | 17byte | 18byte | 19byte | 20byte |
|---|---|---|---|---|---|
| AD2 | AD3 | AD4 | Parity | Result | SUM |

COMMUNICATION SYSTEM, COMMUNICATION CONTROL METHOD, AND PROGRAM FOR IMPLEMENTING THE METHOD

BACKGROUND OF THE INVENTION

1. Field of the Invention

The present invention relates to a communication system, a communication control method, and a program for implementing the method, and relates to, for example, a communication system including a master apparatus and a slave apparatus, where the master apparatus controls communication of the slave apparatus, a communication control method applied to the communication system, and a program causing a computer to execute the communication control method.

2. Description of the Related Art

In a conventional communication system where a master apparatus controls communication of a slave apparatus, and data transmission and data reception are carried out simultaneously, the slave apparatus notifies the master apparatus of a result of determination of an error in Nth reception data by returning N+1th reception data with the determination result added thereto to the master apparatus. For example, according to Japanese Laid-Open Patent Publication (Kokai) No. H07-276743, if an error occurs in data transmitted from a master apparatus, a slave apparatus transmits an error status at the time of transmission of the next command (next data transmission).

It should be noted that the error determination method carried out by the slave apparatus includes a method which determines that reception data is normal if the sum of the reception data and a checksum in the reception data coincide with each other, and a method which determines that reception data is normal if parity data added to the reception data has a predetermined value.

However, in the conventional communication system where the data transmission and data reception are carried out simultaneously, since the slave apparatus requests the master apparatus for re-transmission of data by returning N+1th reception data with the determination result added thereto to the master apparatus, the Nth reception data is re-transmitted to the slave apparatus when N+2th reception data is transmitted.

As a result, if there is an error in the reception data, there is a delay before correct data is re-transmitted, and this delay slows down the communication processing speed.

Further, for a conventional system where one apparatus controls another apparatus, there has been proposed a method in which communication control is carried out between these apparatuses, and these apparatuses control each other via the communication (for example, Japanese Laid-Open Patent Publications (Kokai) No. H02-37438, No. H11-143842, and No. 2000-244689). In such a system, if a master-slave type method in which one apparatus acts as a master apparatus, and the other apparatus acts as a slave apparatus, it is possible to provide a system where the one apparatus controls the other apparatus with a relatively inexpensive and simple construction.

However, in the conventional master-slave type communication system, if an error occurs in a data reception control section of the slave apparatus, the slave apparatus can run away while the slave apparatus is out of control of the master apparatus.

Further, when such an error occurs, the master apparatus cannot restore the slave apparatus into a normal operative state, and to cope with this, it is necessary that at least the power of the slave apparatus is turned off, and then turned on to restart the slave apparatus.

Another way to cope with this problem involves providing a signal line (reset control line) between the master apparatus and the slave apparatus for resetting the slave apparatus from the master apparatus. However, this way of providing a reset control line between the apparatuses leads to increased costs.

SUMMARY OF THE INVENTION

It is a first object of the present invention to enable re-transmission processing of reception data to be quickly performed when error occurs in the data.

It is a second object of the present invention to enable a slave apparatus to be automatically restored when an error occurs in the slave apparatus in a master-slave type communication system.

To attain the first and second objects, in a first aspect of the present invention, there is provided a communication system including a first apparatus and a second apparatus that transmit and receive data simultaneously, comprising an error determining device that is provided in the first apparatus and determines error of reception data, and an adding device that is provided in the first apparatus and adds a result of the determination by the error determining device to transmission data being transmitted to the second apparatus.

Preferably, one of the first apparatus and the second apparatus acts as a master apparatus, and the other one of the first apparatus and the second apparatus acts as a slave apparatus.

Preferably, the communication system further comprises a re-transmission determining apparatus that is provided in the second apparatus and determines whether the data transmitted from the first apparatus is to be re-transmitted or not based on the determination result added to the transmission data.

Preferably, the communication system further comprises a setting device that sets start timing of data transmission by the first apparatus and start timing of data transmission by the second apparatus coincident with each other, and sets a length of data transmitted by the second apparatus shorter than a length of data transmitted by the first apparatus.

Preferably, the communication system further comprises a communication control device that is provided in the second apparatus and controls communication by the first apparatus.

Preferably, the error determining device determines error of the reception data based on a checksum included in the reception data.

Preferably, the error determining device determines error of the reception data based on parity data included in the reception data.

Preferably, the communication system further comprises a measuring device that is provided in the first apparatus and measures a time period over which the error determining device consecutively determines that the reception data is erroneous, and an initializing device that is provided in the first apparatus and initializes the first apparatus if the time period measured by the measuring device exceeds a predetermined time period.

More preferably, the predetermined time period is set to a multiple of a time period required for one of a plurality of periodic data transmissions.

Also preferably, the measuring device and the initializing device comprise a watchdog timer. Further, to attain the first object, in a second aspect of the present invention, there is provided a communication method applied to a communication system including a first apparatus and a second apparatus that transmit and receive data simultaneously, comprising an error determining step of causing the first apparatus to determine error of reception data, and an adding step of causing the first apparatus to add a result of the determination in the error determining step to transmission data being transmitted to the second apparatus.

To attain the first and second objects, in a third aspect of the present invention, there is provided a communication apparatus that transmits and receives data to and from a first apparatus simultaneously, comprising an error determining device that determines error of reception data transmitted from the first apparatus, and an adding device that adds a result of the determination by the error determining device to transmission data being transmitted to the first apparatus.

Preferably, one of the first apparatus and the communication apparatus acts as a master apparatus, and the other one of the first apparatus and the communication apparatus acts as a slave apparatus.

Preferably, the communication apparatus further comprises a setting device that sets start timing of data transmission by the first apparatus and start timing of data transmission by the communication apparatus coincident with each other, and sets a length of data transmitted by the communication apparatus shorter than a length of data transmitted by the first apparatus.

Preferably, the error determining device determines error of the reception data based on a checksum included in the reception data.

Preferably, the error determining device determines error of the reception data based on parity data included in the reception data.

Preferably, the communication apparatus further comprises a measuring device that measures a time period over which the error determining device consecutively determines that the reception data is erroneous, and an initializing device that initializes the first apparatus if the time period measured by the measuring device exceeds a predetermined time period.

More preferably, the predetermined time period is set to a multiple of a time period required for one of a plurality of periodic data transmissions.

Preferably, the measuring device and the initializing device comprise a watchdog timer.

To attain the first object, in a fourth aspect of the present invention, there is provided a communication apparatus that transmits and receives data to and from a first apparatus simultaneously, comprising a transmitting device that transmits data to the first apparatus, a receiving device that receives data from the first apparatus in parallel with data transmission by the transmitting device, and a determining device that determines error of data transmitted through an Nth transmission by the transmitting device based on reception data, reception of which is started simultaneously with the Nth transmission.

Preferably, the communication apparatus further comprises a re-transmitting device that re-transmits the data transmitted through the Nth transmission through an N+1th transmission based on a result of the determination by the determining device.

To attain the first object, in a fifth aspect of the present invention, there is provided a communication method for a communication apparatus that transmits and receives data to and from a first apparatus simultaneously, comprising an error determining step of determining error of reception data transmitted from the first apparatus, and an adding step of adding a result of determination in the error determining step to transmission data being transmitted to the first apparatus.

To attain the first object, in a sixth aspect of the present invention, there is provided a communication method for a communication apparatus that transmits and receives data to and from a first apparatus simultaneously, comprising a transmitting step of transmitting data to the first apparatus, a receiving step of receiving data from the first apparatus in parallel with data transmission in the transmitting step, and a determining step of determining error of data transmitted through an Nth transmission in the transmitting step based on reception data, reception of which is started simultaneously with the Nth transmission.

To attain the first object, in a seventh aspect of the present invention, there is provided a program for causing a computer to execute a communication method for a communication apparatus, comprising an error determining mode for determining error of reception data transmitted from the first apparatus, and an adding module for adding a result of determination by the error determining module to transmission data being transmitted to the first apparatus To attain the first object, in an eighth aspect of the present invention, there is provided a program for causing a computer to execute a communication method for a communication apparatus that transmits and receives data to and from a first apparatus simultaneously, comprising a transmitting module for transmitting data to the first apparatus, a receiving module for receiving data from the first apparatus in parallel with data transmission by the transmitting module, and a determining module for determining error of data transmitted through an Nth transmission by the transmitting module based on reception data, reception of which is started simultaneously with the Nth transmission.

The above and other objects, features, and advantages of the invention will become more apparent from the following detailed description taken in conjunction with the accompany with drawings.

BRIEF DESCRIPTION OF THE DRAWINGS

FIG. 4 is a diagram showing the structure of data (data on a Tx line) transmitted from the image reader and received by the automatic original feeder via a communication line (Tx line);

FIG. 5 is a diagram showing the structure of data (data on a Rx line) transmitted from the automatic original feeder and received by the image reader via the communication line (Rx line);

DETAILED DESCRIPTION OF THE PREFERRED EMBODIMENTS

The present invention will now be described in detail with reference to the drawings showing preferred embodiments thereof.

First, a description will be given of an automatic original feeder and an image reader to which a communication control method according to a first embodiment of the present invention is applied, and then, a description will given of the communication control method. In the present embodiment, the communication control method is applied to data communication carried out between the automatic original feeder and the image reader. The automatic original feeder and the image reader constitute part of a copying machine.

Figure 1:
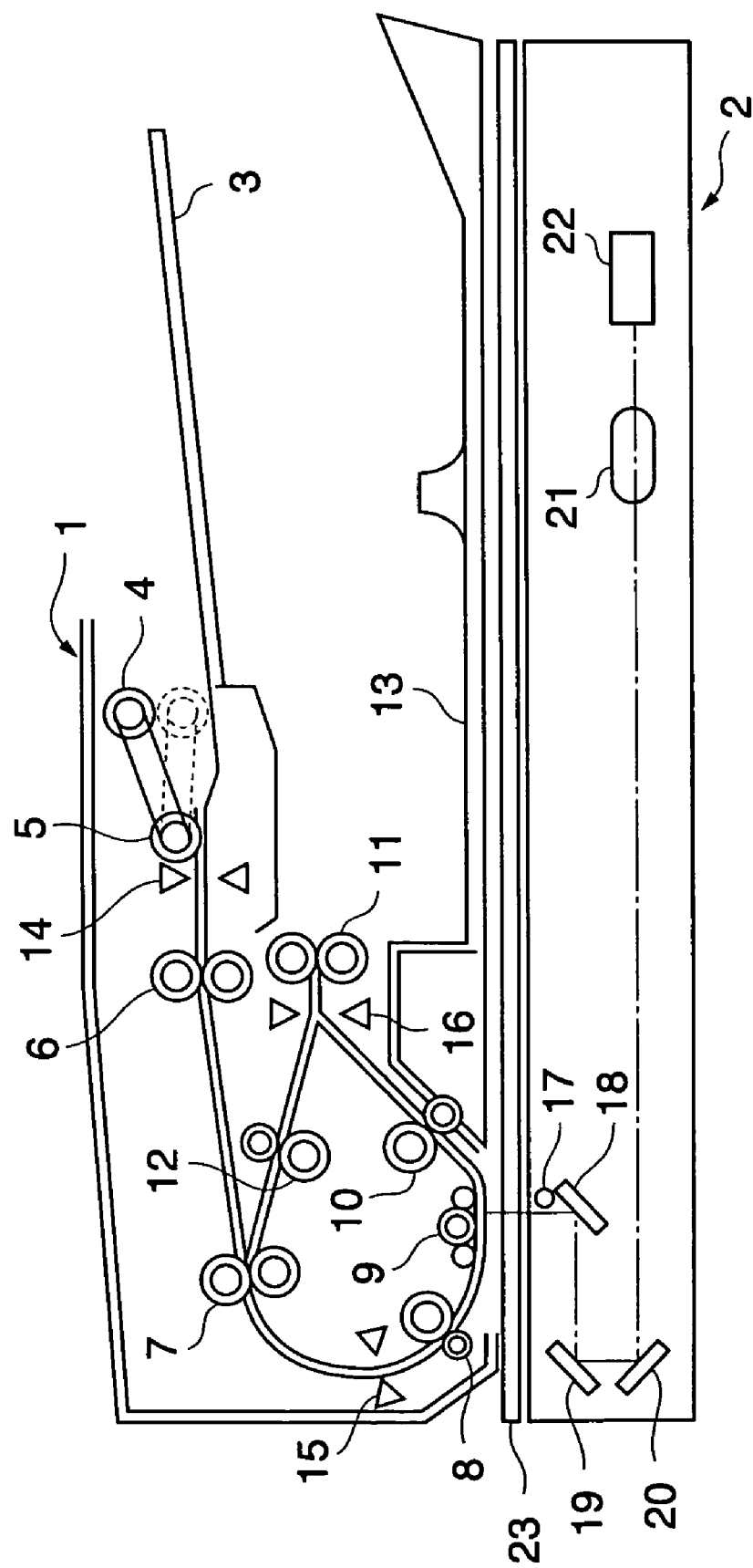
FIG. 1 is a cross sectional view showing the construction of an automatic original feeder and an image reader, to which a communication control method according to a first embodiment is applied.
Figure 2:
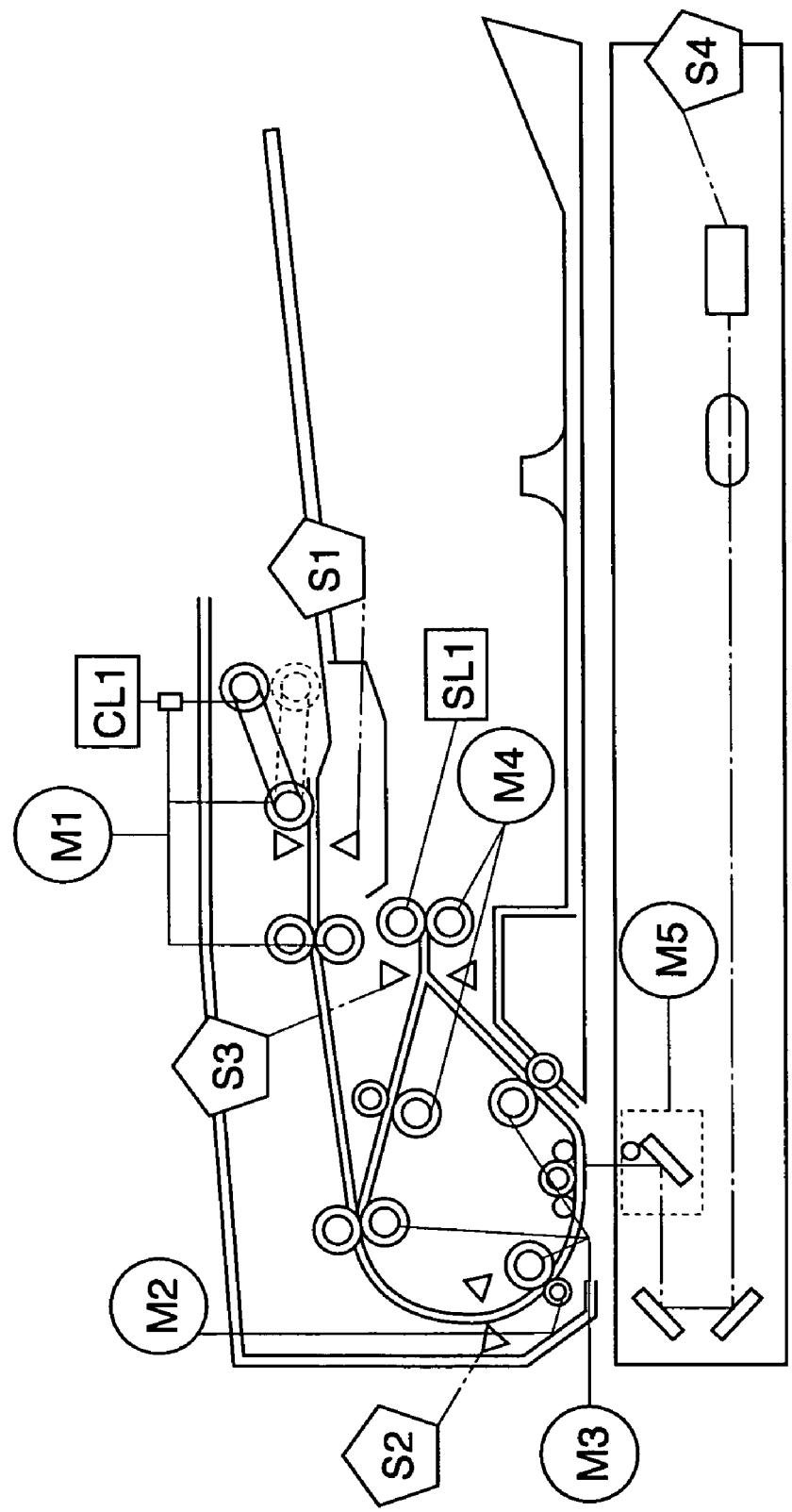
FIG. 2 is a view showing the construction of a driving system of the automatic original feeder and the image reader.

FIG. 1 is a cross sectional view showing the construction of the automatic original feeder and the image reader, to which the communication control method according to a first embodiment is applied, and FIG. 2 is a view showing the construction of a driving system of the automatic original feeder and the image reader.

In these views, reference numeral 1 denotes the automatic original feeder, and reference numeral 2 denotes the image reader. In the image reader 2, a lamp 17 illuminates an original and reflected light from the original is led to a CCD (charge coupled apparatus) 22 (S4 in FIG. 2) via mirrors 18, 19, 20, and a lens 21.

A motor M5 is connected to an optical bench, not shown, which is comprised of the lamp 17 and the mirror 18, and the optical bench is driven by the motor M5 to travel in a sub scanning direction. The motor M5 is implemented by a stepping motor, and the travel of the optical bench is determined by the number of pulses of a pulse signal input to the motor M5.

The reflected light from the original is led to the lens 21 via the mirrors 18, 19, and 20, and converged on the CCD 22 by the lens 21. The CCD 22 subjects the reflected light representing information of the original to photoelectric conversion, and outputs the resulting electronic image signal.

In the image reader 2 constructed as above, the original information is read in a moving original reading mode and a platen glass or stationary reading mode. In the moving original reading mode, information of an original is read while the lamp 17 and the mirror 18 are stopped at an original read position and the automatic original feeder 1 is feeding the original. In the platen glass reading mode, information of an original is read while the original is fixedly placed on a platen glass 23, and the lamp 17 and the mirror 18 are being moved in the sub scanning direction.

The automatic original feeder 1 is provided above the image reader 2 via a hinge mechanism, not shown, for opening/closing with respect to the platen glass 23. The automatic original feeder 1 is mainly comprised of an original tray, a separator, and a conveying section.

As shown in FIG. 1, the original tray 3 is used for stacking originals in the form of sheets. A pair of transverse limiting plates, not shown, are slidably disposed in the original tray 3 in a fashion extending in a width direction, i.e. a transverse direction perpendicular to the conveying direction of originals. The limiting plates act to align originals stacked on the original tray 3 in the transverse direction to secure stability of conveyance of originals being fed.

The separator is comprised of a separation roller 4 is provided above the original tray 3. The separation roller 4 rotates in unison with the rotative driving of the sheet feeding roller 5 to thereby feed originals.

The separation roller 4 is journalled on an arm, not shown, and can be moved up and down as the arm is rocked. The separation roller 4 is normally positioned at a home position which is an upper receding position (indicated by solid lines in FIG. 1) so as not to hinder an operation of setting the originals. When a sheet feed operation is started, the separation roller 4 is moved down to a position indicated by dotted lines in FIG. 1, where it comes into contact with the upper surface of the original.

A separation pad, not shown, is provided at a location opposed to the sheet feeding roller 5 in a fashion being urged against the sheet feeding roller 5. The separation pad is formed of a rubber material whose friction is slightly lower than that of the sheet feeding roller 5. The separation pad separates one original from originals fed by the separation roller 4, and the sheet feeding roller 5 feeds the separated one original.

A pair of first registration rollers 6 serves as a registration means that aligns a leading end of the original fed by the sheet feeding roller 5 such that the leading end of the original is caused to abut on a nip of the pair of first registration rollers 6 which are in a stationary state, thereby forming a loop of the original.

A sheet feed clutch CL1 serves as a coupling means for transmitting a driving force of a sheet feed motor M1 to the pair of first registration rollers 6. When the sheet feed clutch CL1 is engaged, the pair of first registration rollers 6 are driven.

A pair of second registration rollers 7 are provided in the conveying section. The pair of second registration rollers 7 convey the original which has been conveyed by the pair of first registration rollers 6 to a pair of lead rollers 8. The pair of lead rollers 8 convey the original toward the platen glass 23. The original which has been conveyed to the platen glass 23 passes a platen roller 9, is picked up by a pair of lead discharging rollers 10, and is discharged onto an original discharge tray 13 by a pair of sheet discharging rollers 11.

In a double-sided reading mode, the original is not discharged by the pair of sheet discharging rollers 11, but is switched back by the pair of sheet discharging rollers 11 being inversely rotated, to be conveyed toward a pair of inversion rollers 12 disposed at an upper location. The original is conveyed by the pair of inversion rollers 12 and reaches the pair of second registration rollers 7, whereafter the original is conveyed in the same way as described above, so that the reverse side surface of the original is read.

A description will now be given of a driving system that drives respective rollers and the like by mainly referring to FIG. 2.

The sheet feed motor M1 is implemented by a stepping motor, and can rotate in normal and reverse directions to separate and covey originals.

When the sheet feed motor M1 rotates in a sheet feeding direction, the separation roller 4 is moved down from the home position into urging contact with the uppermost original of the originals in the original tray 3, and the separation roller 4, the sheet feeding roller 5, and the pair of first registration rollers 6 are driven at the same time.

When the sheet feed motor M1 rotates in a conveying direction, which is opposite to the sheet feeding direction, the separation roller 4 is moved up to the home position.

The sheet feed clutch CL1 serves as a driving force engaging mechanism which transmits the driving force of the sheet feed motor M1 to the pair of first registration rollers 6.

A separation motor M2 rotates in normal and reverse directions, to bring the pair of lead rollers 8 into contact with each other or separate them from each other.

A lead motor M3 is implemented by a stepping motor and drives the pair of second registration rollers 7, the pair of lead rollers 8, the platen roller 9, the pair of lead discharging rollers 10. The lead motor M3 drives the respective rollers so that the original is conveyed at such a speed that an image on each original can be read.

A sheet discharging motor M4 drives the pair of sheet discharging rollers 11 and the pair of inversion rollers 12, and can rotate both in normal and reverse directions.

A sheet discharging roller separating solenoid SL1 separates and presses a driven roller of the pair of sheet discharging rollers 11 from and against the driving roller of them during the switchback for reading a double-sided original.

Next, a description will now be given of sensors in the driving system.

In the original tray 3, there is provided a set original detecting sensor, not shown, which is implemented by a light-transmission type optical sensor, and determines whether originals are set in the original tray 3.

Further, a sheet width detecting sensor, not shown, which detects the positions of the transverse limiting plates of the original tray 3 is provided at the bottom of the original tray 3, and detects the length in the transverse direction of the originals set on the original tray 3.

A registration sensor 14 (S1), which is an light-transmission type optical sensor, and detects an original, is provided between the sheet feeding roller 5 and the pair of first registration rollers 6, and detects the passage of the leading end of the original which has been separated and fed. The resulting detection signal is used for controlling the amount of abutment (loop) on the pair of first registration rollers 6.

A lead sensor 15 (S2), which is a reflection type optical sensor and detects the original, is provided between the pair of second registration rollers 7 and the pair of lead rollers 8. The resulting detection signal serves as a reference signal for start timing of image reading by the image reader 2.

A sheet discharge sensor 16 (S3), which is a light-transmission type optical sensor and detects the original, is provided immediately upstream of the pair of sheet discharging rollers 11, and detects sheet discharge timing of the original, or the like.

A description will now be given of an original feeding operation carried out by the automatic original feeder 1.

When copying conditions are input and a start key is pressed on an operating section, not shown, of the copying machine, the sheet width detecting sensor in the original tray 3 detects the size of the originals. Further, when the set original detecting sensor detects that originals are set on the original tray 3, the sheet feed motor M1 is reversely rotated by a predetermined amount so that the separation roller 4 is moved down into urging contact with the top of the originals. After the separation roller 4 is brought in urging contact with the top of the originals, the sheet feed motor M1 is rotated in the normal direction, whereby the original is conveyed downstream by the feeding force of the sheet feeding roller 5.

The original which has been conveyed by the sheet feeding roller 5 is aligned at its leading end by the pair of first registration rollers 6, and is conveyed to the pair of second registration rollers 7. The pair of second registration rollers 7 in turn convey the original to the pair of lead rollers 8.

When the leading end of the original reaches the lead sensor 15 (S2), the reference signal indicative of the image read start timing is output from the lead sensor 15 (S2) to the image reader 2. Then, the image reader 2 prepares for the image reading. The image of the original which has been conveyed toward the platen glass 23 is read by the image reader 2 while the original is being conveyed by the platen roller 9 and the pair of lead discharging rollers 10.

Upon completion of the image reading, the original is loaded onto the original discharge tray 13 by the pair of sheet discharging rollers 11.

In the double-sided reading mode, the original is not discharged by the pair of sheet discharging rollers 11, but is switched back to be guided to a sheet path disposed at an upper location. Then, the original is conveyed toward the pair of inversion rollers 12 and the pair of second registration rollers 7. On this occasion, when the sheet discharge sensor 16 (S3) detects the leading end of the original, the leading end of the original is aligned by the pair of second registration rollers 7.

Figure 3:
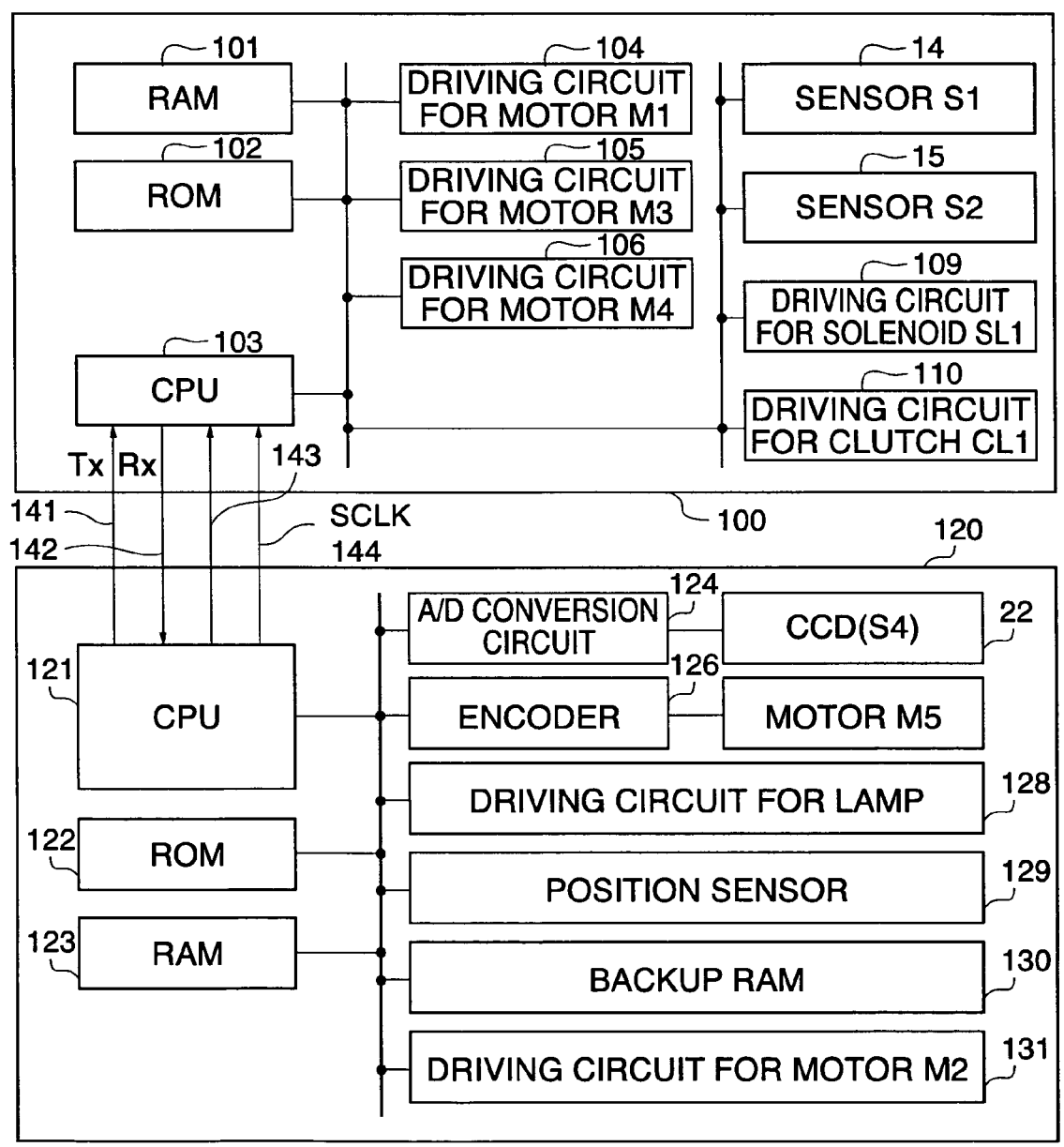
FIG. 3 is a block diagram showing the arrangement of control circuits of the automatic original feeder and the image reader.

FIG. 3 is a block diagram showing the arrangement of control circuits of the automatic original feeder 1 and the image reader 2.

Reference numeral 100 denotes a control circuit of the automatic original feeder 1, and reference numeral 120 denotes a control circuit of the image reader 2.

The control circuit 100 of the automatic original feeder 1 includes a microprocessor (CPU) 103 as a main component. Driving circuits for various types of loads are connected to output ports of the CPU 103, and detection signals of respective sensors are input to input ports. The control circuit 100 is provided with a RAM 101 and a ROM 102 which stores a communication control sequence program. A communication line 141 (Tx), a communication line 142 (Rx), a signal line 143, and a signal line 144 are provided between the CPU 103 and a CPU 121 of the image reader 2.

The communication line 141 (Tx) and the communication line 142 (Rx) are used for data communication between the automatic original feeder 1 and the image reader 2. The signal line 143 transmits a communication start timing reference signal DF_LOAD whose rising edge serves as reference timing for starting the communication between the automatic original feeder 1 and the image reader 2. The signal line 144 transmits a reference clock signal SCLK for synchronization of the operations of the automatic original feeder 1 and the image reader 2 with data transmission and data reception there between. The CPU 121 on the master side in terms of communication outputs the reference clock signal SCLK at a predetermined frequency. The CPU 103 on the slave side receives one-bit data at each clock pulse of the reference clock signal SCLK by monitoring the voltage level of a signal from the CPU 121 on the communication line 141 (Tx) when the CPU 103 detects a rising edge (or a falling edge) of the reference clock signal SCLK. Further, the CPU 103 transmits one-bit data to the CPU 121 at each clock pulse of the reference clock signal SCLK by changing the voltage of a signal on the communication line 142 (Rx) in synchronism with a rising edge (or a falling edge) of the reference clock signal SCLK.

Reference numerals 104 to 106 denote driving circuits (D) for the motors M1, M3, and M4, respectively, and supply the motors M1, M3, and M4 with respective driving signals. The driving circuits 104 to 106 are connected to the CPU 103, and the operations of these transmitted from the CPU 103. The CPU 103 outputs a motor current control signal by writing predetermined data received via the communication line 141 (Tx) on a data register of the output ports. It should be noted that the phase excitation signals need to change faster than the speed of regular communication between the automatic original feeder 1 and the image reader 2, and therefore the phase excitation signals are transmitted via clock lines, not shown, between the CPU 103 and the CPU 121.

Reference numerals 109 and 110 denote driving circuits (D) for the sheet discharging roller separating solenoid SL1 and the sheet feed clutch CL1, respectively, and these driving circuits 109 and 110 supply the sheet discharging roller separating solenoid SL1, and the sheet feed clutch CL1 with respective driving signals. The driving circuits 109 and 110 are connected to the CPU 103, and the operations of these circuits 109 and 110 are controlled by signals transmitted from the CPU 103.

The respective detection signals from the registration sensor 14 (S1) and the lead sensor 15 (2) are supplied to the CPU 103.

On the other hand, the control circuit 120 of the automatic original feeder 2 includes the microprocessor (CPU) 121 as a main component. Driving circuits for various types of loads are connected to output ports of the CPU 121, and detection signals from respective sensors are input to input ports.

Reference numeral 126 denotes an encoder of the motor M5, and is connected to the CPU 121. The CPU 121 determines that a failure is present in the motor M5 if the CPU 121 provides a driving instruction to the motor M5 but the encoder 126 cannot detect the rotation of the motor M5.

Reference numeral 128 denotes a driving circuit (D) for the lamp 17, and drives the lamp 17 to turn on according to a control signal from the CPU 121.

Reference numeral 129 denotes a position sensor which detects the position of the lamp 17, and the resulting detection signal is transmitted to the CPU 121.

Reference numeral 130 denotes a backup RAM.

Reference numeral 131 denotes a driving circuit (D) for the separating motor M2, generates a driving signal based on a control signal from the CPU 121, and supplies the separating motor M2 with the driving signal.

The CCD 22 is connected to the CPU 121 via an A/D conversion circuit 124. The image signal from the CCD 22 is converted to a digital signal by the A/D conversion circuit 124, and then, is transmitted to the CPU 121.

The control circuit 120 is provided with a RAM 123 and a ROM 122 which stores a control sequence program. The ROM 122 stores programs relating to image reading control carried out by the image reader 2, control programs relating to the original conveyance carried out by the automatic original feeder 1, and programs for controlling the communication between the image reader 2 and the automatic original feeder 1.

The communication start timing reference signal DF_LOAD transmitted via the signal line 143, and the reference clock signal SCLK transmitted via the signal line 144 are output from the CPU 121 of the image reader 2. The CPU 121 on the master side receives one-bit data from the slave CPU 103 at each clock pulse of the reference clock signal SCLK by monitoring the voltage level of the signal on the communication line 142 (Rx) when the CPU 121 detects a rising edge (or a falling edge) of the reference clock signal SCLK. Further, the CPU 121 transmits one-bit data to the CPU 103 at each clock pulse of the reference clock signal SCLK by changing the voltage of the signal on the communication line 141 (Tx) in synchronism with a rising edge (or a falling edge) of the reference clock signal SCLK.

The CPU 121 of the image reader 2 drives the motors, the clutch, the solenoid, and other components of the automatic original feeder 1 via the communication line 141 (Tx) according to the programs stored in the ROM 122. The CPU 121 also monitors the sensors and other components of the automatic original feeder 1 via the communication line 142 (Rx). The control relating to the original feeding by the automatic original feeder 1 is carried out by controlling the various driving loads of the automatic original feeder 1.

Although in the present embodiment, the CPU 103 carries out the communication control on the automatic original feeder 1 side, a gate array capable of carrying out communication control may carry out the communication control. Further, the ROM 102 of the automatic original feeder 1 may store a control program relating to the original feeding by the automatic original feeder 1, and the CPU 103 may execute the control programs.

A description will now be given of the method of controlling communication between the automatic original feeder 1 and the image reader 2. It should be noted that the communication control method described below may be applied not only to the communication between the automatic original feeder 1 and the image reader 2 but also to communication between OA apparatuses such as an image forming apparatus, a printer, and a facsimile, and other apparatuses carrying out master-slave type communications.

FIG. 4 is a diagram showing the structure of data (data on the Tx line) transmitted from the image reader 2 and received by the automatic original feeder 1 via the communication line 141 (Tx).

The image reader 2 on the communication master side sets all the data on the Tx line. In the present embodiment, the data on the Tx line is defined in terms of 13 bytes.

OUT signals described in the first and second bytes represent information input to the input ports of the CPU 103 of the automatic original feeder 1. For example, the seventh bit of the first byte is assigned to an ON/OFF signal for the sheet feed clutch CL1 of the automatic original feeder 1. If the image reader 2 writes "1" in the seventh bit and transmits the data, the driving circuit 110 for the sheet feed clutch CL1 of the automatic original feeder 1 turns on the sheet feed clutch CL1, so that the driving force of the sheet feed motor M1 is transmitted to the pair of first registration rollers 6. If the image reader 2 writes "0" in the bit 7, the driving circuit 110 for the sheet feed clutch CL1 of the automatic original feeder 1 turns off the sheet feed clutch CL1, so that the driving force of the sheet feeder motor M1 is no longer transmitted to the pair of first registration rollers 6.

Output values of a PWM signal to be output from the CPU 103 of the automatic original feeder 1 are described in the third to seventh bytes of the data on the Tx line. The image reader 2 can control the output values of the PWM signals to be output from the CPU 103 of the automatic original feeder 1 by changing the setting of the PWM values.

D/A output values are described in the eighth and ninth bytes of the data on the Tx line. D/A output values to be output from the CPU 103 of the automatic original feeder 1 can be set on the image reader 2 side.

Data for ON/OFF control and data for switching between normal and reverse rotation directions of the respective motors of the automatic original feeder 1 are described in the tenth and eleventh bytes of the data on the Tx line. The respective motors are assigned to respective bits of the tenth byte. If "1" is written in one of the bits, the corresponding motor is driven, and if "0" is written, the corresponding motor is stopped. The respective motors are also assigned to respective bits of the eleventh byte. If "1" is written in one of the bits, the corresponding motor is driven in the reverse direction, and if "0" is written, the corresponding motor is driven in the normal direction.

Parity data is described in the 12th byte of the data on the Tx line.

A checksum is described in the 13th byte of the data on the Tx line.

FIG. 5 is a diagram showing the structure of data (data on the Rx line) transmitted from the automatic original feeder 1 and received by the image reader 2 via the communication line 142 (Rx).

The automatic original feeder 1 serving as the communication slave sets all the data on the Rx line. In the present embodiment, the data on the Rx line is defined in terms of 20 bytes.

OUT signals described in the first and second bytes represent the actual operation states of the actuators based on control signals output from the output ports of the CPU 103 of the automatic original feeder 1: For example, if the CPU 103 outputs an ON/OFF signal to the driving circuit 110 for the sheet feed clutch CL1 so that the driving circuit 110 causes the sheet feed clutch CL1 to operate according to the ON/OFF signal, the operation state of the sheet feed clutch CL1 is stored in the seventh bit of the first byte when the communication start timing reference signal (DF-_LOAD) turns ON.

Output values of the PWM signal which the CPU 103 of the automatic original feeder 1 actually outputs are described in the third to seventh bytes of the data on the Rx line.

D/A output values (values of a D/A output register of the CPU 103) which the CPU 103 of the automatic original feeder 1 actually outputs are described in the eighth and ninth bytes of the data on the Rx line.

The actual operation states of the respective motors based on for ON/OFF control and data for switching between normal and reverse rotation directions output to the driving circuits 104 to 106 for the respective motors from the output ports of the CPU 103 of the automatic original feeder 1 are described in the tenth and eleventh bytes of the data on the Rx line. The respective motors are assigned to respective bits of the tenth byte. If "1" is written in one of the bits, it indicates that the corresponding motor is actually operating, and if "0" written, it indicates that the corresponding motor is actually stopped. The respective motors are also assigned to respective bits of the eleventh byte. If "1" is written in one of the bits, it indicates that the corresponding motor is actually driven in the reverse direction, and if "0" is written, it indicates that the corresponding motor is actually driven in the normal direction.

In the 12th and 13th bytes of the data on the Rx line, the values of the input ports of the CPU 103 of the automatic original feeder 1 are described.

In the 14th to seventeenth bytes of the data on the Rx line, results of A/D conversion for four channels by the CPU 103 of the automatic original feeder 1 are described.

The image reader 2 can monitor the state of the automatic original feeder 1 by referring to the respective values described in the third to seventeenth bytes.

In the 18th byte of the data on the Rx line, parity data is described.

In the 19th byte of the data on the Rx line, result data is described. The result data contains results of an error determination carried out on the data on the Tx line received by the automatic original feeder 1. As the result data, 01H is described if the data on the Tx line has been normally received, 02H is described if the data has not normally been received, and 00H is described if the error determination has not been completed within a predetermined time period T2, described later, for example. The error determination is carried out based on the checksum and the parity data on the Tx line.

In the 20th byte of the data on the Rx line, a checksum is described.

Figure 6:
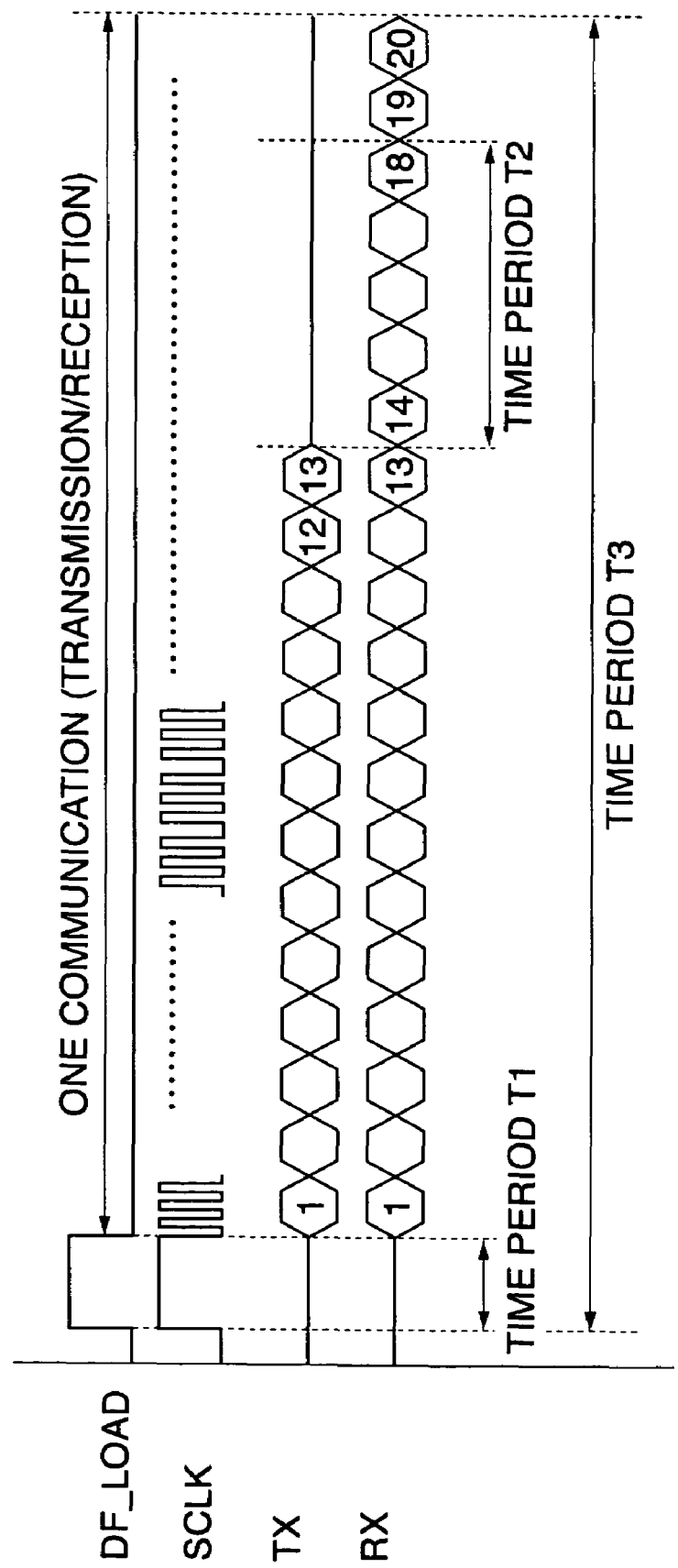
FIG. 6 is a timing chart useful in explaining data communication between the automatic original feeder and the image reader.

FIG. 6 is a timing chart useful in explaining data communication between the automatic original feeder 1 and the image reader 2.

The communication shown in FIG. 6 is always and continuously carried out between the image reader 2 and the automatic original feeder 1. In the present embodiment, the image reader 2 is set as the master, and the automatic original feeder 1 is set as the slave in the communication, and hence the image reader 2 always takes the initiative in controlling the communication. With this arrangement, it is desirable that a time required for carrying out one communication in the sequence of communications does not vary, namely, is always constant. Therefore, the data on the Tx line and the data on the Rx line are set to respective fixed lengths, 13 bytes and 20 bytes, in the present embodiment.

The communication method of the present embodiment employs a clock synchronization method based on the reference clock signal SCLK transmitted via the signal line 144. The repetition period with which the reference clock signal SCLK turns ON and OFF is equal to the communication baud rate. The communication baud rate may be arbitrarily set, and is set to 100 kbps in the present embodiment.

Although the relationship between the master and the slave is fixed in the present embodiment, the relationship between the master and the slave may not be fixed. For example, a communication method may be employed in which an apparatus which needs to initiate communication is a master.

In the present embodiment, there are provided two communication lines 141 and 142 serving as the Tx line and the Rx line, respectively, and the data can be transmitted and received in one communication using communication control, described later. Alternatively, insofar as the data can be transmitted/received in one communication, asynchronous communication without using a reference clock, such as a start-stop method, may be employed.

The communication start timing reference signal DF_LOAD is output over a predetermined time period T1 from the CPU 121 of the image reader 2. In the present embodiment, the predetermined time period T1 is set to approximately 50 μs. When the communication start timing reference signal DF_LOAD changes from OFF to ON to start the present (Nth) communication, the CPU 121 of the image reader 2 stores transmission data Tx to be transmitted to the CPU 103 of the automatic original feeder 1 for the present (Nth) communication in the RAM 123, and the CPU 121 becomes ready for receiving reception data Rx to be transmitted from the CPU 103 of the automatic original feeder 1 for the present (Nth) communication.

The CPU 121 of the image reader 2 transmits the reference clock signal SCLK to the CPU 103 of the automatic original feeder 1 immediately upon the communication timing reference signal DF_LOAD for the present (Nth) communication changing from ON to OFF. The CPU 121 transmits transmission data Tx for the present (Nth) communication stored in the RAM 123 bit by bit to the CPU 103 of the automatic original feeder 1 via the Tx line (signal line 141) in synchronism with the reference clock signal SCLK. The CPU 121 also receives reception data Rx for the present (Nth) communication transmitted from the CPU 103 of the automatic original feeder 1 via the Rx line (signal line 142) in synchronism with the reference clock signal SCLK.

The transmission of the transmission data Tx for the present (Nth) communication and the reception of the reception data Rx for the present (Nth) communication are started at the same time. The data length of the reception data Rx (20 bytes) is longer than the data length of the transmission data Tx (13 bytes), the reception of the reception data Rx for the present (Nth) communication is continued even after the transmission of the transmission data Tx for the present (Nth) communication is completed.

The CPU 121 of the image reader 2 serving as the master stops outputting the reference clock signal SCLK immediately upon receipt of the 20th byte of the reception data Rx for the present (Nth) communication transmitted from the automatic original feeder 1.

The CPU 121 compares the sum of the data described in the first to 19th bytes of the reception data Rx for the present (Nth) communication and the value (checksum) described in the 20th byte of the reception data Rx for the present (Nth) communication with each other. If these values do not coincide with each other, the CPU 121 of the image reader 2 discards the reception data Rx for the present (Nth) communication, and re-transmits the transmission data Tx for the present (Nth) communication in the next (N+1th) communication.

If these values coincide with each other, the CPU 121 checks the parity data described in the 18th byte of the reception data Rx for the present (Nth) communication, and determines whether the parity data has a predetermined value (value which is neither 00H nor FFH) determined in advance for use in communication between the image reader 2 and the automatic original feeder 1.

If the parity data does not have the predetermined value, the CPU 121 determines that the reception of the reception data Rx for the present (Nth) communication has failed, discards the reception data Rx for the present (Nth) communication, and re-transmits the transmission data Tx for the present (Nth) communication in the next (N+1th) communication.

If the parity data has the predetermined value, the CPU 121 determines that the reception data Rx for the present (Nth) communication has been successful, and then, checks the value of the result data described in the 19th byte of the reception data Rx for the present (Nth) communication. If the result data has the value of 00H or 02H, this means that the CPU 103 of the automatic original feeder 1 has not properly received the transmission data Tx for the present (Nth) communication transmitted by the CPU 121 of the image reader 2, or has been unable to determine whether the reception was erroneous or not within the predetermined time period. Therefore, the CPU 121 re-transmits the transmission data Tx for the present (Nth) communication in the next (N+1th) communication.

If all of the checksum, the parity data, and the result data show values indicating that the normal communication has been carried out, the CPU 121 determines that one communication (transmission and reception) has been normally completed.

On the other hand, when the communication start timing reference signal DF_LOAD for the present (Nth) communication has turned from OFF to ON, the CPU 103 of the automatic original feeder 1 as the slave gets ready for receiving the transmission data Tx for the present (Nth) communication transmitted from the CPU 121 of the image reader 2, and gets ready for transmitting the reception data Rx for the present (Nth) communication to the CPU 121 of the image reader 2 at the same time. When the communication timing reference signal DF_LOAD for the present (Nth) communication changes from ON to OFF, the reference clock signal SCLK is transmitted from the CPU 121 of the image reader 2 to the CPU 103, and the CPU 103 receives the transmission data Tx for the present (Nth) communication bit by bit in synchronism with the reference clock signal SCLK. The CPU 103 also transmits the reception data Rx for the present (Nth) communication bit by bit in synchronism with the reference clock signal SCLK. When the CPU 103 completes the reception of the thirteen bytes of transmission data Tx for the present (Nth) communication, the CPU 103 carries out data check similar to the above described reception data check by the image reader 2.

The CPU 103 continues transmitting the reception data Rx for the present (Nth) communication after completion of the reception of the transmission data Tx for the present (Nth) communication. A time period from the completion of the reception of the transmission data Tx for the present (Nth) communication to the completion of the transmission of the 18th byte of the reception data Rx for the present (Nth) communication (time period required for transmitting the 14th to 18th bytes of the reception data Rx for the present (Nth) communication to the CPU 121 of the image reader 2) is designated by T2.

In the present embodiment, since the communication baud rate is 100 kbps, the time period T2 is expressed by the following equation:

$$T2 = 5 \text{ bytes} \times 8 \text{ bits} \div 100 \text{ kbps} = 400 \text{ μs}$$

When receiving the transmission data Tx for the present (Nth) communication, the CPU 103 of the automatic original feeder 1 as the slave carries out the error determination of the received transmission data Tx for the present (Nth)

communication based on the parity data and the checksum thereof within the time period T2 (400 μs) after the receipt of the transmission data Tx.

If the CPU 103 determines that the transmission data Tx for the present (Nth) communication has been normally received, the CPU 103 writes 01H as the result data in the 19th byte of the reception data Rx for the present (Nth) communication which is being transmitted to the CPU 121 of the image reader 2. On the other hand, if the CPU 103 determines that the transmission data Tx has not been normally received, the CPU 103 discards the received transmission data Tx for the present (Nth) communication, and writes 02H in the 19th byte of the reception data Rx for the present (Nth) communication. If the CPU 103 cannot complete the error determination of the received transmission data Tx for the present (Nth) communication within the time period T2 (400 μs), the CPU 103 writes 00H in the 19th byte of the reception data Rx for the present (Nth) communication.

When the communication start timing reference signal DF_LOAD for the next (N+1th) communication changes from OFF to ON, the CPU 103 determines reception data Rx for the next (N+1th) communication to be transmitted to the CPU 121 of the image reader 2, and stores the determined reception data Rx in the RAM 101. It should be noted that a value to be described as the result data in the 19th byte of the reception data Rx for the next (N+1th) communication has not been determined yet when the communication start timing reference signal DF_LOAD for the next (N+1th) communication has turned ON, as described above.

When the communication start timing reference signal DF_LOAD for the next (N+1th) communication changes from ON to OFF, the CPU 121 transmits the reference clock signal SCLK. The CPU 103 transmits the reception data Rx for the next (N+1th) communication stored in the RAM 101 bit by bit in synchronism with the reference clock signal SCLK to the CPU 121 of the image reader 2. At the same time, the CPU 103 also receives the transmission data Tx for the next (N+1th) communication transmitted from the CPU 121 of the image reader 2. When the CPU 103 has transmitted the reception data Rx for the next (N+1th) communication up to the 13th byte, the CPU 103 has completed the reception of the transmission data Tx for the next (N+1th) communication.

Then, the CPU 103 determines the result data to be described in the 19th byte of the reception data Rx for the next (N+1th) communication, and then writes the result data while transmitting the 14th to 18th bytes of the reception data Rx for the next (N+1th) communication to the CPU 121 of the image reader 2. The CPU 103 also calculates the checksum to be described in the 20th byte, and writes the checksum.

When the CPU 103 has completed the transmission of the reception data Rx for the next (N+1th) communication up to the 20th byte in this way, the CPU 103 terminates the communication process.

In the above described communication control method, a time period T3 required for one communication (transmission and reception) is expressed by the following equation:

$$T3=T1+20\ bytes \times 8\ bits \div 100\ kbps=1.65\ ms.$$

The image reader 2 as the master controls the automatic original feeder 1 as the slave, and one communication is completed within the time period T3 (=1.65 ms). The communication is repeated in this manner.

Figure 7:
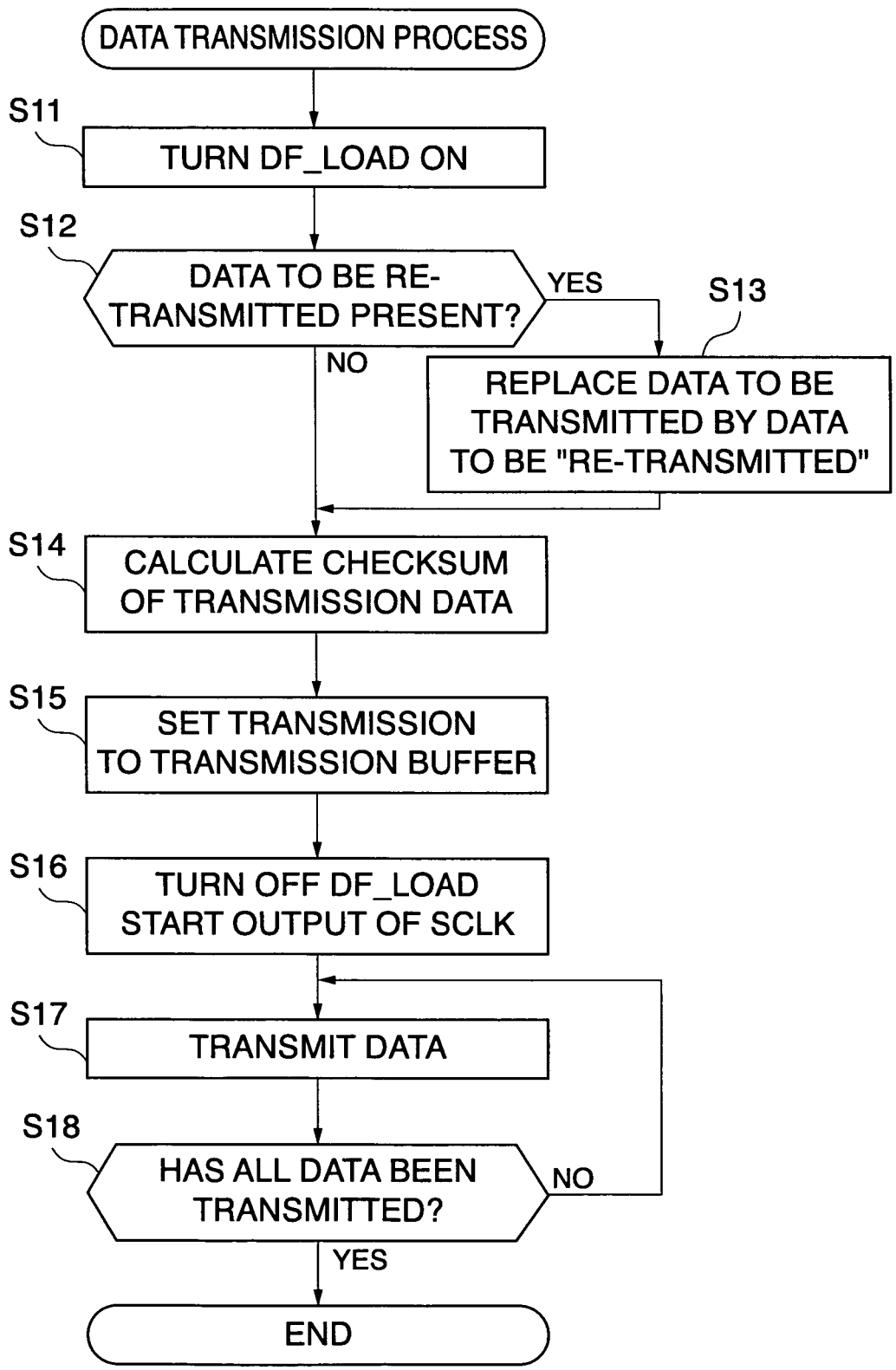
FIG. 7 is a flowchart showing the procedure of a data transmission process (data transmission via the Tx line) carried out by the image reader serving as a master.

FIG. 7 is a flowchart showing the procedure of the data transmission process (data transmission via the Tx line) carried out by the image reader 2 as the master. The CPU 121 of the image reader 2 turns ON the communication start timing reference signal DF_LOAD to start the transmission of the transmission data Tx (step S11). On this occasion, the CPU 121 determines whether transmission data to be re-transmitted is present or not (step S12). If there is no transmission data to be re-transmitted, the CPU 121 prepares transmission data Tx to be transmitted to the CPU 103 according to the control program relating to the original feeding stored in the ROM 122, and stores the transmission data Tx in the RAM 123.

On the other hand, if there is transmission data to be re-transmitted, the transmission data to be re-transmitted is stored in an area of the RAM 123 corresponding to the thirteen bytes of transmission data prepared for the transmission in the present communication (step S13).

The CPU 121 calculates the checksum of the transmission data to be transmitted (step S14), and writes the transmission data in a transmission buffer (RAM 123) (step S15).

The CPU 121 of the image reader 2 turns OFF the communication start timing reference signal DF_LOAD and starts outputting the reference clock signal SCLK (step S16). At the same time, the CPU 121 transmits the transmission data stored in the RAM 123 bit by bit in synchronism with the reference clock signal SCLK (step S17). When the CPU 121 has completed the transmission of the transmission data ("YES" in the step S18), the CPU 121 terminates the data transmission process.

Even if the CPU 121 of the image reader 2 determines that there is transmission data to be re-transmitted (the result data described in the 19th byte of the reception data Rx transmitted from the automatic original feeder 1 is 00H or 02H in the immediately preceding communication) but determines that it is not necessary to re-transmit the transmission data for the immediately preceding communication, it is not necessary to replace the transmission data prepared for the transmission for the present communication by the re-transmission data in the step S13.

Figure 8:
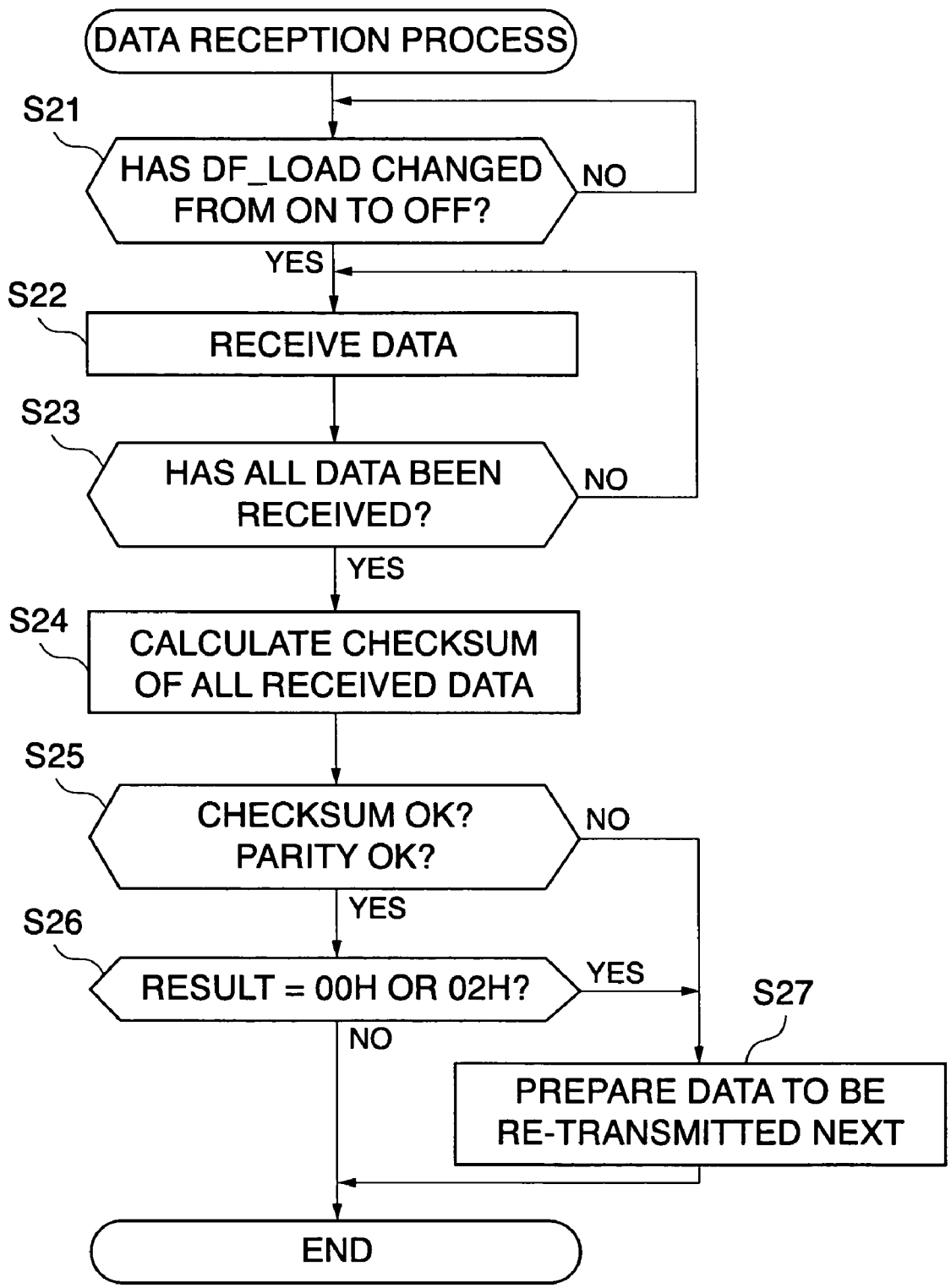
FIG. 8 is a flowchart showing the procedure of a data reception process (data reception via the Rx line) carried out by the image reader serving as the master.

FIG. 8 is a flowchart showing the procedure of the data reception process (data reception via the Rx line) carried out by the image reader 2 as the master.

The CPU 121 of the image reader 2 changes the communication start timing reference signal DF_LOAD from ON to OFF (step S21). On this occasion, the CPU 121 starts outputting the reference clock signal SCLK. The CPU 121 receives the reception data Rx transmitted from the CPU 103 of the automatic original feeder 1 bit by bit in synchronism with the reference clock signal SCLK (step S22). If the CPU 121 has completed the reception of twenty bytes of the reception data Rx ("YES" in the step S23), the CPU 121 stops outputting the reference clock signal SCLK, and calculates the sum of the first to 19th bytes of the received reception data Rx (step S24).

If the sum of the first to 19th bytes of the received reception data Rx and the checksum (SUM) described in the 20th byte of the reception data Rx coincide with each other, and the parity data (Parity) described in the 18th byte has the predetermined value (value other than 00H and FFH) at the same time ("YES" in the step S25), the CPU 121 of the image reader 2 determines that the reception of the reception data Rx has been successful.

On the other hand, if the sum of the first to 19th bytes of the reception data Rx and the checksum described in the 20th byte of the reception data Rx do not coincide with each other, or the parity data described in the 18th byte of the reception data Rx does not have the predetermined value (value other than 00H and FFH) ("NO" in the step S25), the CPU 121 discards the received reception data Rx, and re-transmits the transmission data Tx for the present (Nth) communication in the next (N+1th) communication (step S27).

If the affirmative ("YES") determination is made in the step S25, the CPU 121 determines whether the result data described in the 19th byte of the reception data Rx is either 00H or 02H or not (step S26). If it is determined that the result data is either 00H or 02H ("YES" in the step S26), this means that the CPU 103 of the automatic original feeder 1 has not normally received the transmission data Tx for the present (Nth) communication transmitted from the CPU 121 of the image reader 2, or the CPU 103 has not been able to carry out the error determination of the transmission data Tx for the present (Nth) communication within the predetermine time period. Therefore, the CPU 121 prepares the transmission data Tx for the present (Nth) communication as data to be re-transmitted in the next (N+1th) communication on the RAM 123 (step S27), and terminates the data reception process. On the other hand, if it is determined that the result data is neither 00H nor 02H (the result data is 01H) ("NO" in the step S26), this means that the CPU 103 of the automatic original feeder 1 has normally received the transmission data Tx for the present (Nth) communication. Thus, the CPU 121 terminates the data reception process.

Figure 9:
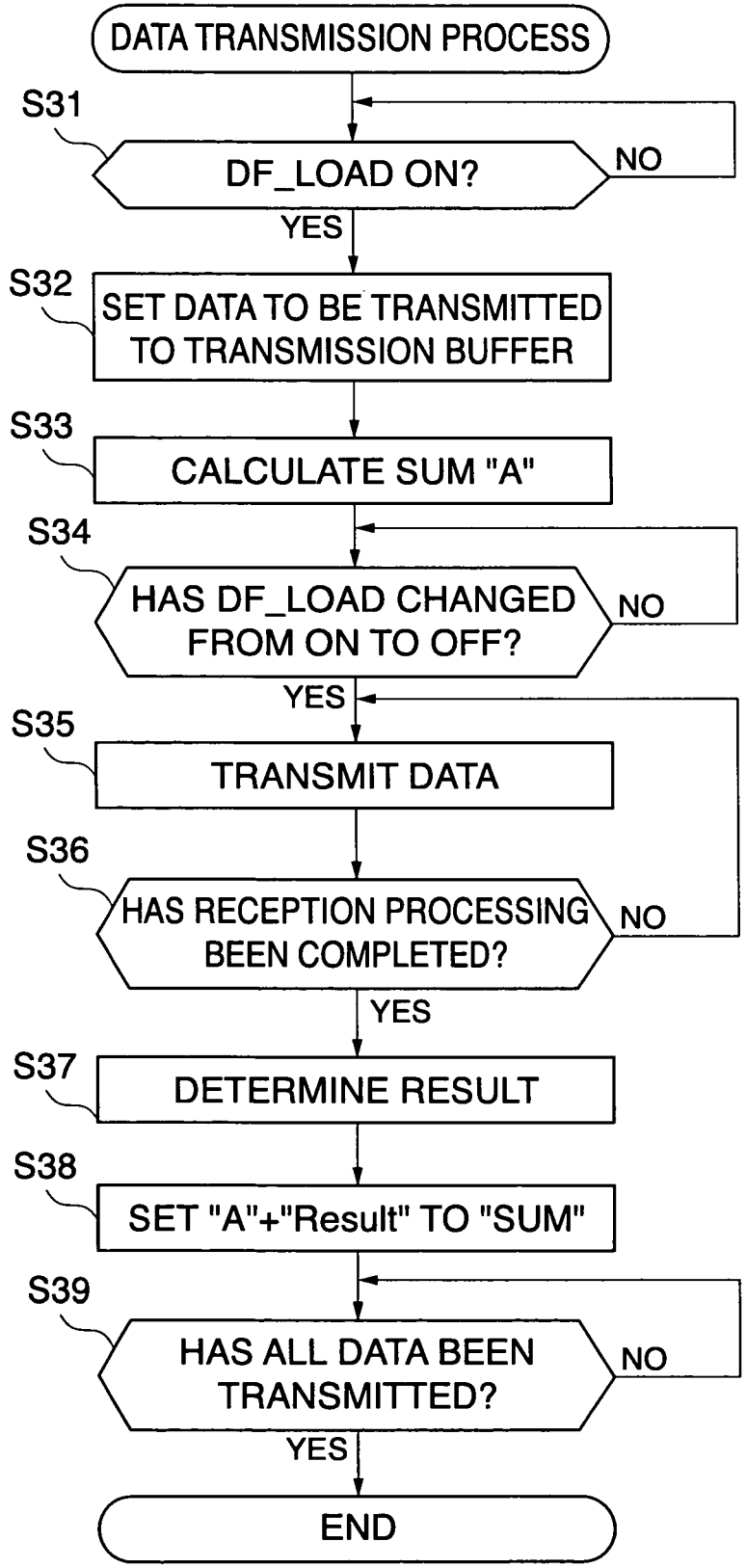
FIG. 9 is a flowchart showing the procedure of a data transmission process (data transmission via the Rx line) carried out by the automatic original feeder serving as a slave.

FIG. 9 is a flowchart showing the procedure of the data transmission process (data transmission via the Rx line) carried out by the automatic original feeder 1 as the slave.

If the CPU 103 of the automatic original feeder 1 detects a change from OFF to ON of the communication start timing reference signal DF_LOAD ("YES" in the step S31), the CPU 103 stores the reception data Rx to be transmitted in the RAM 101 (step S32). Then, the CPU 103 calculates the sum "A" of all of the data except for the result data (19th byte) and the checksum (20th byte), and writes the sum "A" in the 20th byte (step S33).

If the CPU 103 detects an edge from ON to OFF of the communication start timing reference signal DF_LOAD ("YES" in the step S34), the CPU 103 starts transmitting the reception data Rx to the image reader 2 (step S35). On this occasion, the CPU 103 transmits the data bit by bit in synchronism with the reference clock signal SCLK output from the CPU 121 of the image reader 2, and determines whether the reception of the transmission data Tx via the Tx line from the image reader 2 has been completed or not each time one byte is transmitted (step S36). If the CPU 103 has not completed the reception of the transmission data Tx, the process returns to the step S35, and the CPU 103 transmits the next one byte of the reception data Rx. If the CPU 103 has completed the reception of all the thirteen bytes of transmission data Tx, the process proceeds to the step S37. The CPU 103 determines whether the CPU 103 has normally received the transmission data Tx, and writes the determination result as the result data in the 19th byte of the reception data Rx (step S37). Then, the CPU 103 writes the value obtained by adding the above described sum "A" which has been described in the 20th byte in advance to the value of the result data described in the 19th byte as an updated checksum in the 20th byte (step S38).

If the CPU 103 cannot determine the determination result to be described as the result data in the 19th byte of the reception data Rx even after the predetermined time period T2 has passed, the CPU 103 writes 00H in the 19th byte of the reception data Rx.

If the CPU 103 has transmitted all the twenty bytes of reception data Rx to the image reader 2 ("YES" in S39), the CPU 103 terminates the data transmission process.

Figure 10:
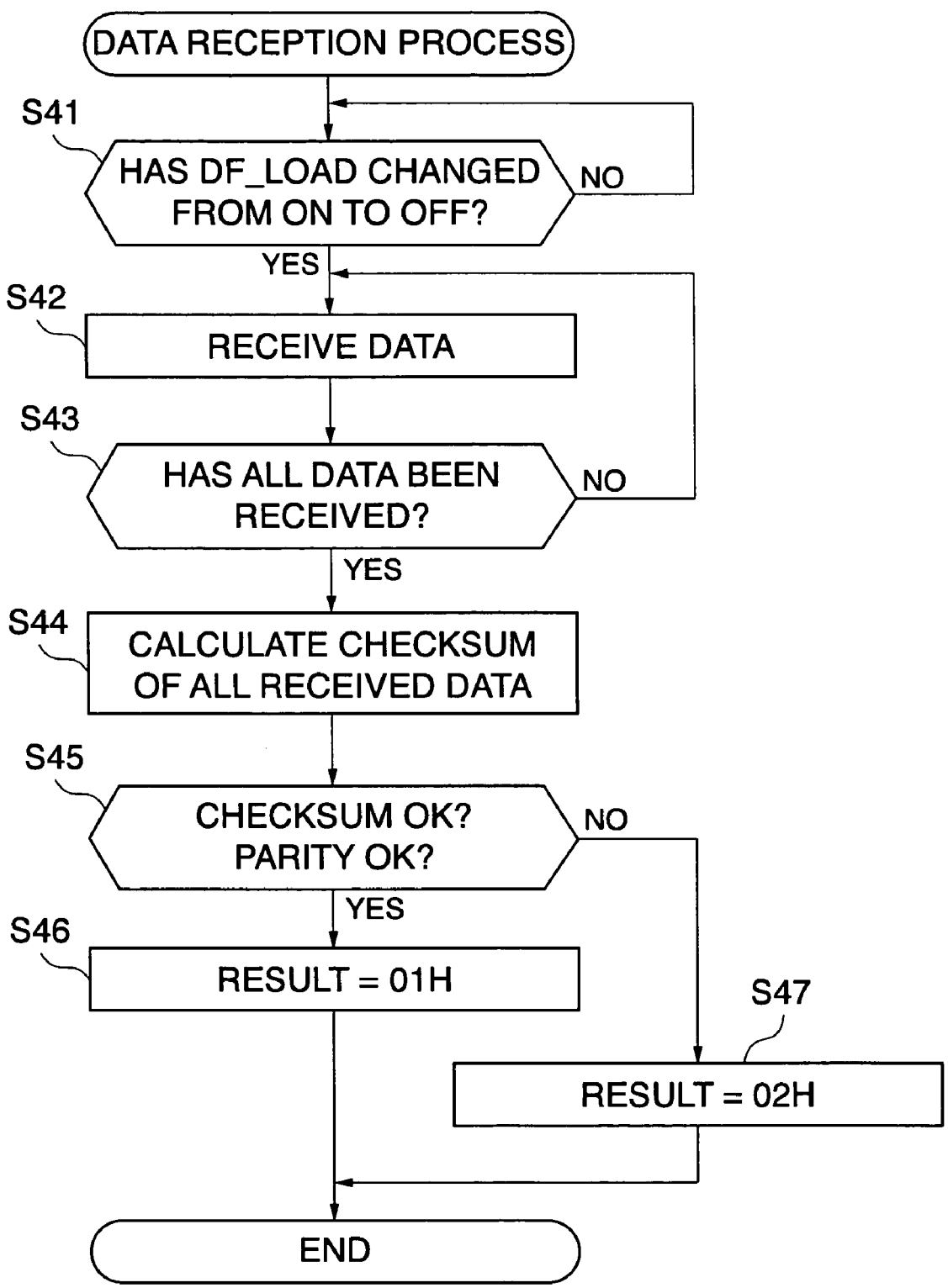
FIG. 10 is a flowchart showing the procedure of a data reception process (data reception via the Tx line) carried out by the automatic original feeder serving as the slave.

FIG. 10 is a flowchart showing the procedure of the data reception process (data reception via the Tx line) carried out by the automatic original feeder 1 as the slave.

If the communication start timing reference signal DF_LOAD changes from OFF to ON, the CPU 103 of the automatic original feeder 1 becomes ready for receiving the data. Then, upon detection of an edge from ON to OFF of the communication start timing reference signal DF_LOAD ("YES" in the step S41), the CPU 103 starts receiving the transmission data Tx. The CPU 103 receives the transmission data Tx bit by bit in synchronism with the reference clock signal SCLK output from the CPU 121 of the image reader 2 (step S42).

The CPU 103 determines whether all the transmission data Tx having the predetermined byte length (thirteen bytes in this case) has been received each time one byte of the transmission data Tx is received (step S43). Upon completion of the reception of the entire transmission data Tx, the CPU 103 calculates the checksum, and checks whether the parity data described in the 12th byte of the transmission data Tx has the predetermined value which is neither 00H nor FFH (step S44). If both the check sum and the parity data are proper ("YES" in the step S45), the CPU 103 writes 01H as the result data in the 19th byte of the reception data Rx for the present (Nth) communication to be transmitted to the image reader 2 (step S46). On the other hand, if either the checksum or the parity data is not proper ("NO" in the step S45), the CPU 103 writes 02H as the result data in the 19th byte of the reception data Rx to be transmitted to the image reader 2 for the present communication (step S47), and then discards the received transmission data Tx. Then, the CPU 103 terminates the data reception process.

As described above, according to the communication control method of the present embodiment in which the transmission and the reception of the data carried out simultaneously in the master-slave arrangement, the data lengths of the transmission data and the reception data are set such that the timing in which the slave apparatus completes the data transmission is later than the timing in which the slave apparatus completes the data reception. And, when an error is present in data received by the slave apparatus from the master apparatus, the slave apparatus transmits a message that notifies the data error present in the data received from the master apparatus to the master apparatus by adding the message to the end of the data whose transmission to the master apparatus has not been completed yet. As a result, the reception error detected by the slave apparatus can be notified to the master apparatus in one data communication.

Although in the above described embodiment, the slave apparatus determines an error in the data transmitted from the master apparatus, the master apparatus may determine an error in the data transmitted from the slave apparatus. In this case, the data lengths of the transmission data and the reception data are set such that the timing in which the master apparatus completes the data transmission is later than the timing in which the master apparatus completes the data reception. If an error is present in data received by the master apparatus from the slave apparatus, the master apparatus transmits a message that notifies the data error present in the data received from the slave apparatus to the slave apparatus by adding the message to the end of the data whose transmission to the slave apparatus has not been completed yet. As a result, the reception error present on the master apparatus can be notified to the slave apparatus in one data communication.

Therefore, in a communication system employing the present communication control method, the re-transmission processing of data received by the slave apparatus can be quickly performed when there is an error in the received data.

Next, a description will now be given of a second embodiment of the present invention.

The second embodiment is basically identical in construction with the first embodiment, the following description of the second embodiment refers to the construction of the first embodiment and is limited only to elements and parts different from those in the first embodiment.

Figure 11:
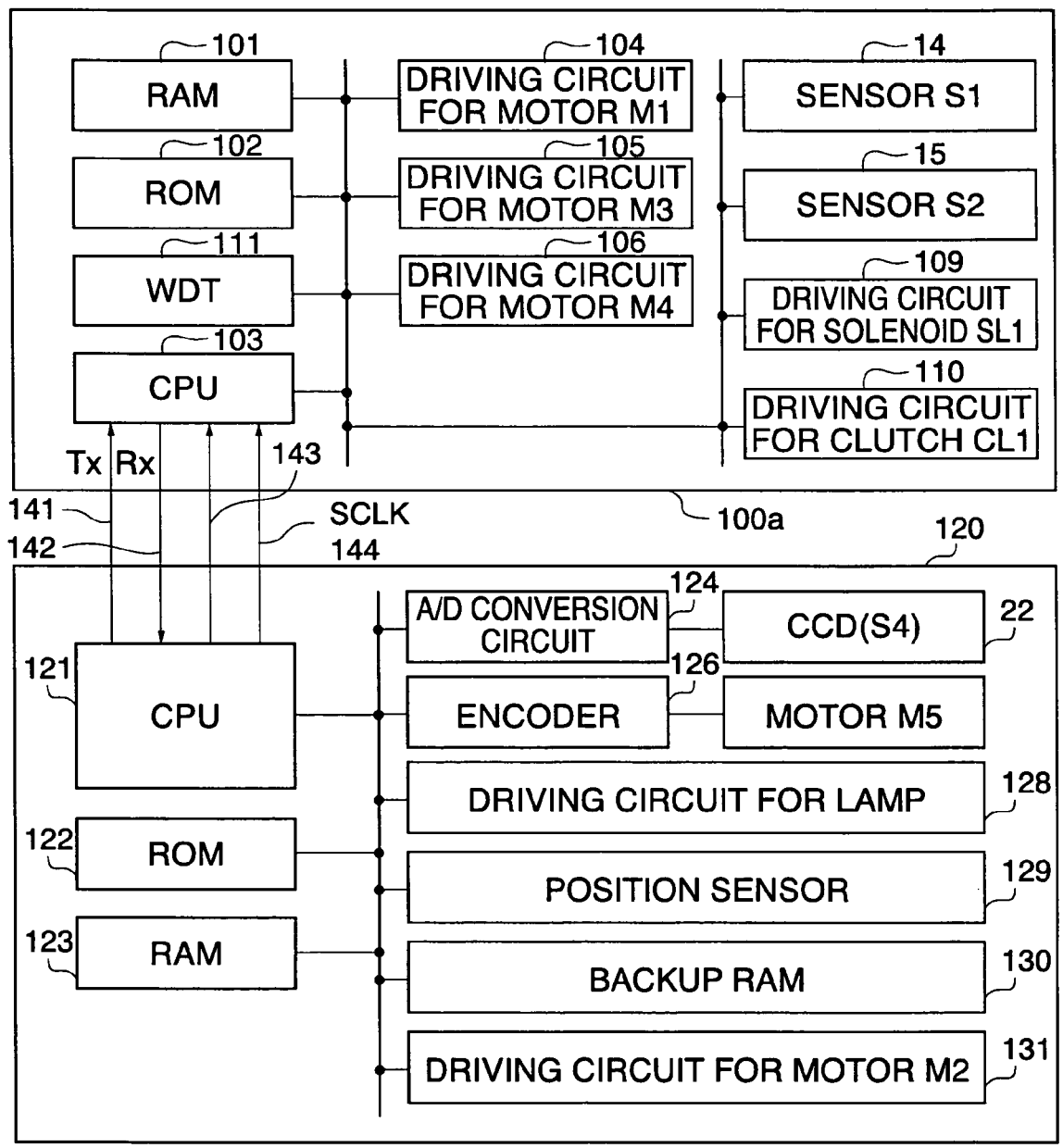
FIG. 11 is a block diagram showing the arrangement of control circuits of an automatic original feeder and an image reader, to which a communication control method according to a second embodiment of the present invention is applied.

FIG. 11 is a block diagram showing the arrangement of control circuits of an automatic original feeder and an image reader, to which the communication control method according to the second embodiment is applied. In FIG. 11, parts and elements corresponding to those of the first embodiment are designated by identical reference numerals, and hence description thereof is omitted.

A watchdog timer (hereinafter referred to as the "WDT") 111 is additionally provided in a control circuit 100a of the automatic original feeder 1 in the second embodiment.

The WDT 111 includes an up-count type timer counter, which starts counting up in synchronism with a pulse clock signal (which is also used for the operation of the CPU 103) output from an oscillator, not shown, immediately after the CPU 103 is reset.

Once the WDT 111 starts a counting operation, it operates independently of the processing by the CPU 103 according to the communication control sequence program.

The CPU 103 periodically rewrites (clears) the count of the timer counter of the WDT 111 to prevent the timer counter from overflowing. However, if a situation occurs in which the CPU 103 cannot rewrite the count of the timer counter of the WDT 111, the timer counter overflows, so that a reset signal is input to a reset input terminal, not shown, of the CPU 103 to reset the same. The reset of the CPU 103 can cause initialization of the RAM 101, the ROM 102, the driving circuits for various types of loads, and other components of the automatic original feeder 1.

When the CPU 103 is released from the reset state, the CPU 103 starts the processing according to the communication control sequence program from the outset.

In the present embodiment, the time period before the timer counter of the WDT 111 overflows is set to 50 ms, for example.

Figure 12:
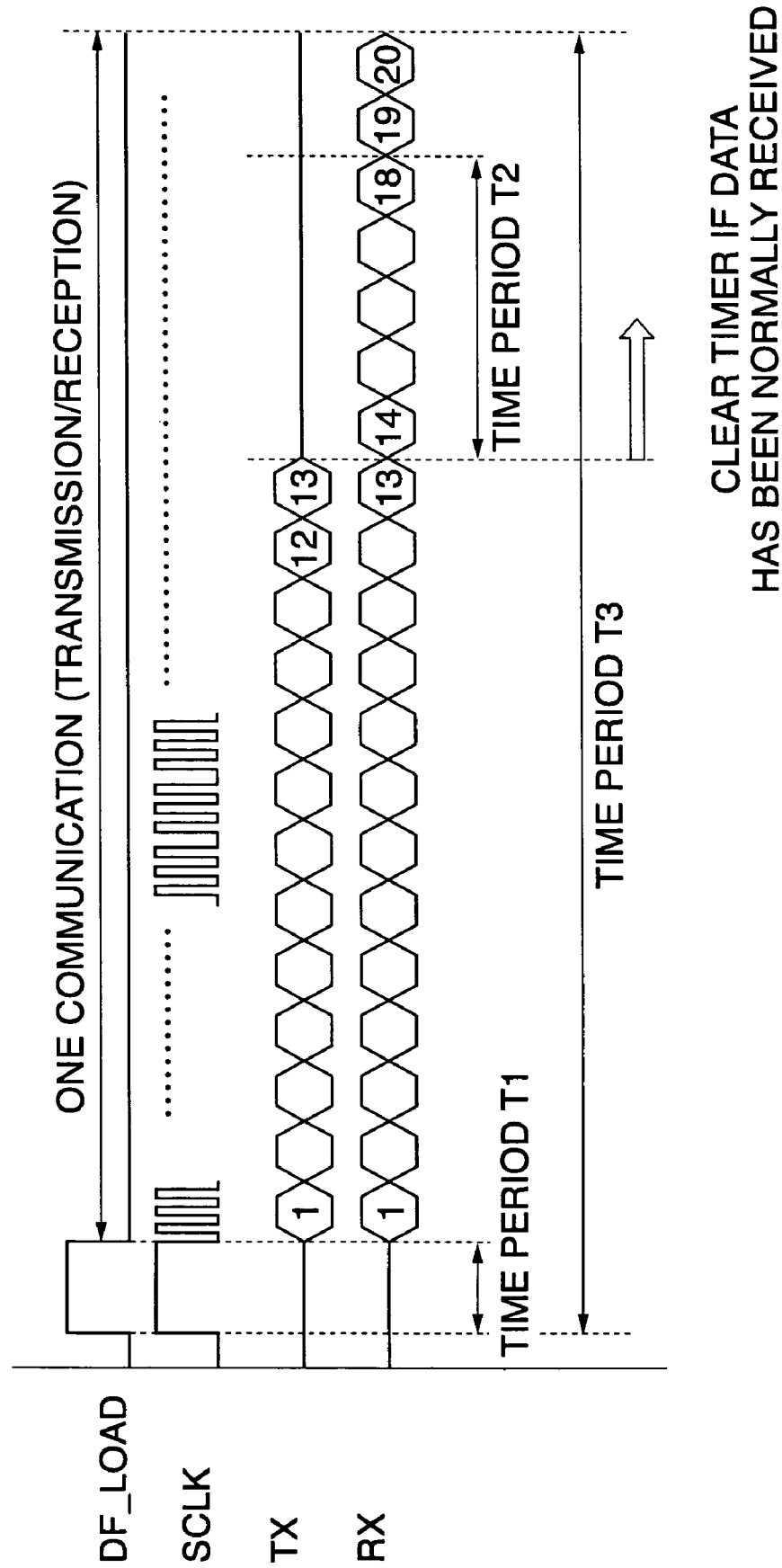
FIG. 12 is a timing chart useful in explaining data communication carried out between the automatic original feeder and the image reader according to the second embodiment.

Then, when the CPU 103 of the automatic original feeder 1 determines that the transmission data Tx for the present (Nth) communication has been normally received, the CPU 103 rewrites (clears) the count of the timer counter of the WDT 111 as shown in FIG. 12. FIG. 12 is a timing chart useful in explaining data communication carried out between the automatic original feeder 1 and the image reader 2 according to the second embodiment.

Figure 13:
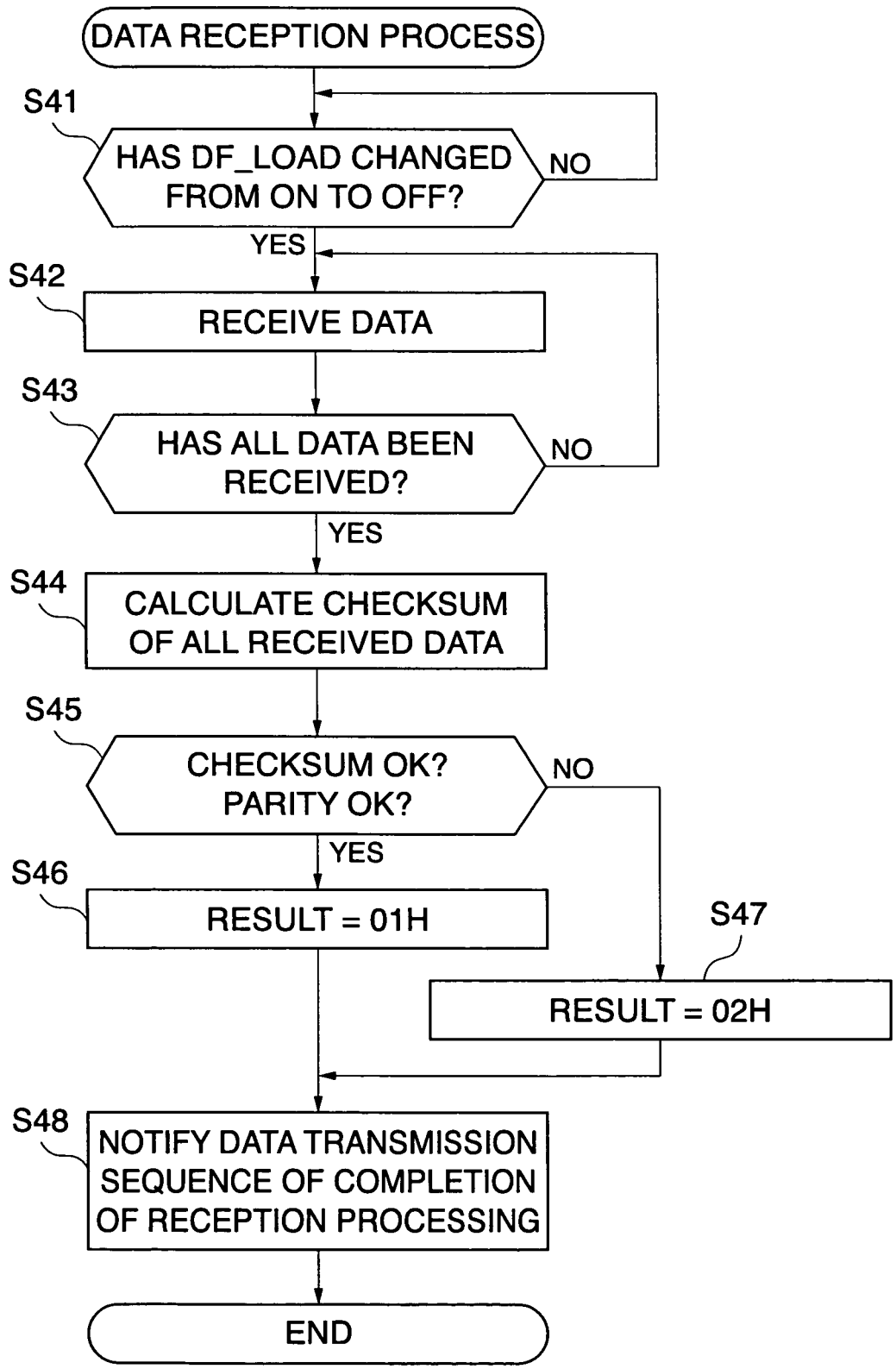
FIG. 13 is a flowchart showing the procedure of a data reception process (data reception via a Tx line) carried out by the automatic original feeder serving as a slave according to the second embodiment.

FIG. 13 is a flowchart showing the procedure of a data reception process (data reception via the Tx line) carried out by the automatic original feeder 1 as a slave according to the second embodiment. Since the processing from the step S41 to the step S47 in FIG. 13 is identical to the processing in the first embodiment in FIG. 10, these steps are designated by identical step numbers, and hence description thereof is omitted.

In the second embodiment, after writing the result data in the 19th byte of the reception data Rx for the present (Nth) communication, the CPU 103 of the automatic original feeder 1 notifies a data transmission sequence of the completion of the data reception processing, and terminates the data reception process in a step S48.

A description will now be given of a method of restoring the automatic original feeder 1 by automatically resetting the CPU 103 of the automatic original feeder 1 if an error occurs in the CPU 103.

Figure 14:
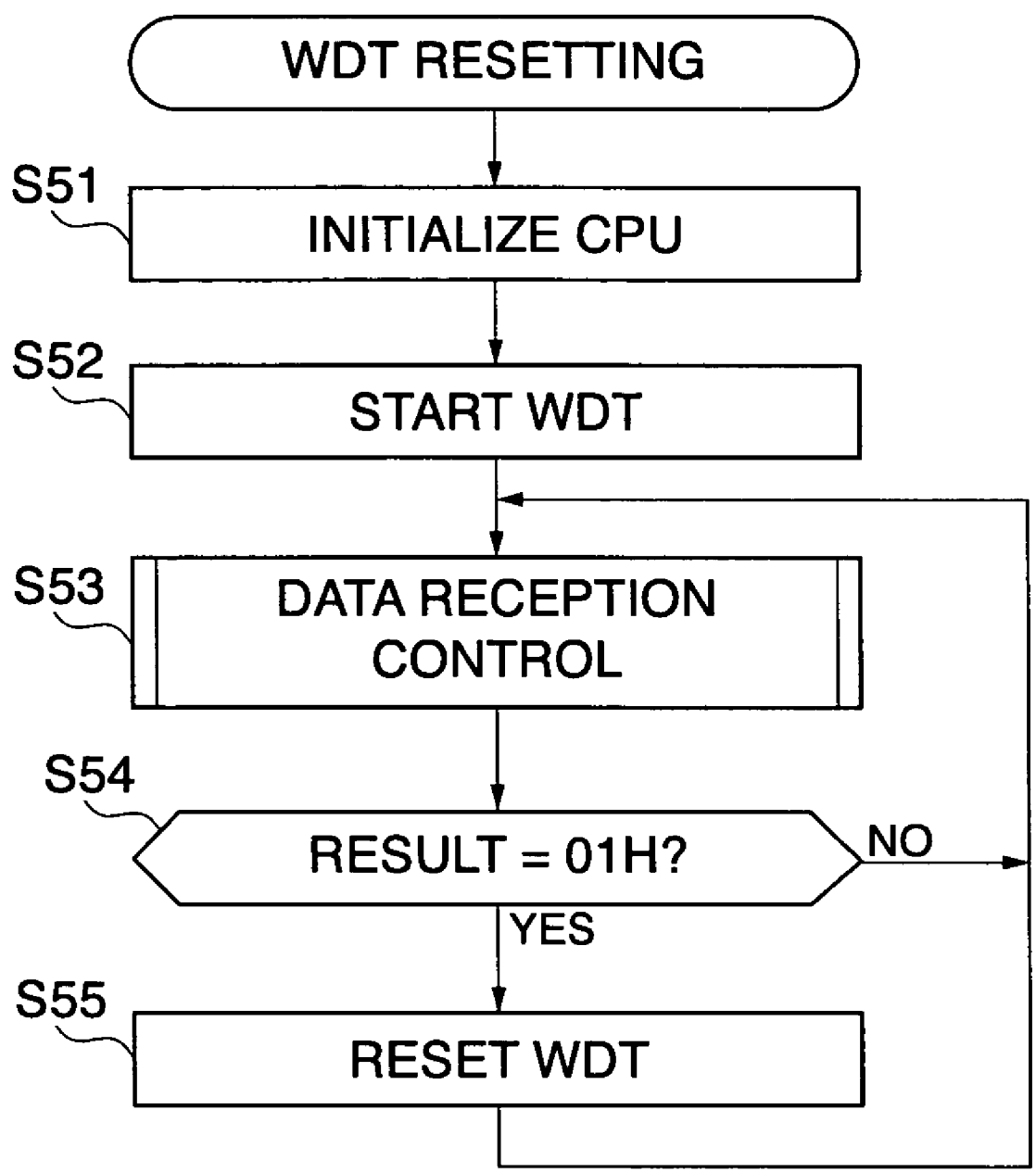
FIG. 14 is a flowchart showing the procedure of a WDT (watchdog timer) reset process carried out by a CPU of the automatic original feeder.

FIG. 14 is a flowchart showing the procedure of a WDT reset process carried out by the CPU 103 in the automatic original feeder 1.

The CPU 103 carries out processing relating to the initialization of the CPU 103 such as input/output setting of the ports and initialization of internal registers immediately after the CPU 103 is turned ON (step S51). Then, the CPU 103 starts the WDT (watchdog timer) 111 (step S52).

Then, the CPU 103 carries out data reception, processing (data reception via the Tx line) by the automatic original feeder 1 as the slave as shown in FIG. 14 (step S53). Then, the CPU 103 determines whether the result data to be described in the 19th byte of the reception data Rx for the present (Nth) communication has been determined to be 01H or not (step S54). On this occasion, if the result data has been determined to be 01H, this means that the transmission data Tx for the present (Nth) communication has been normally received from the CPU 121 of the image reader 2, and hence the process proceeds to a step S55 to clear the counter of the WDT 111. Then, the process returns to the step S53, wherein the CPU 103 starts the data reception control for the next (N+1th) communication.

On the other hand, if the result data has not been determined to be 01H, this means that the CPU 103 has not normally received the transmission data Tx for the present (Nth) communication from the CPU 121 of the image reader 2, or has not been able to carry out the error determination within the predetermined time period T2. Therefore, the CPU 121 does not reset (clear) the counter of the WDT 111, and the process returns to the step S53, wherein the CPU 121 carries out the data reception control for the next (N+1th) communication.

It should be noted that the timer counter of the WDT 111 is not cleared also when the communication is not carried out between the automatic original feeder 1 and the image reader 2.

Figure 15:
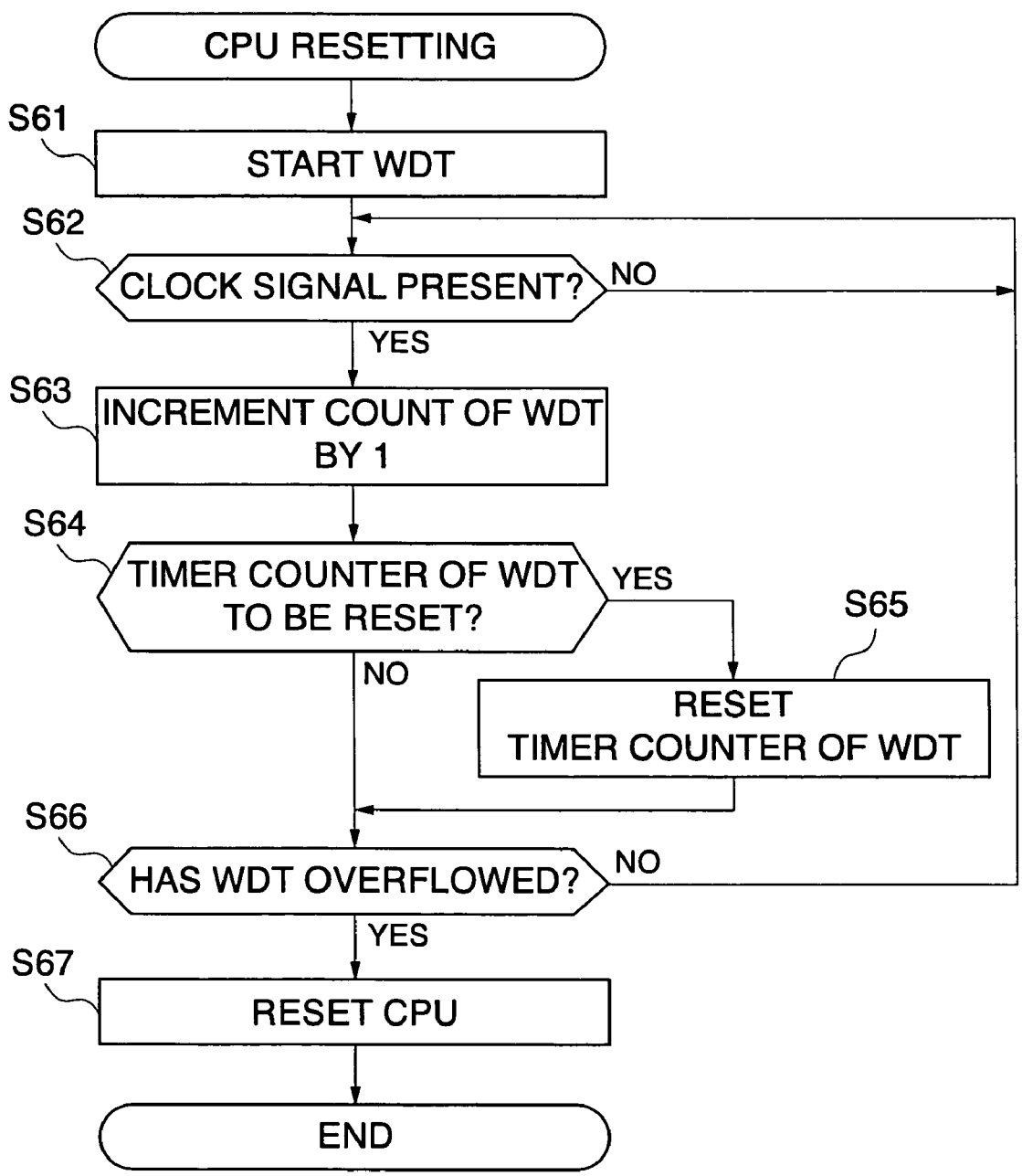
FIG. 15 is a flowchart showing a reset processing for resetting the CPU of the image reader by a WDT.

FIG. 15 is a flowchart showing the reset processing for resetting the CPU 103 by the WDT 111.

The WDT 111 is activated by the CPU 103 immediately after reset of the CPU 103 (step S61).

The WDT 111 receives the same clock pulse as is supplied to the CPU 103. If the WDT has received a predetermined number of clock pulses ("YES" in a step S62), the timer counter of the WDT 111 is incremented by 1 (step S63).

Then, if the CPU 103 determines that the WDT 111 is to be reset as a result of the processing shown in FIG. 14 ("YES" in the step S64), the CPU 103 resets the timer counter of the WDT 111 (step S65). If the CPU 103 determines that the WDT 111 is not to be reset ("NO" in the step S64), the CPU 103 does not reset the WDT 111, and the process proceeds to a step S66.

In the step S66, the CPU 103 determines whether the timer counter of the WDT 111 has overflowed or not. If it is determined that the timer counter has not overflowed, the process returns to the step S62, wherein the CPU 103 waits for the pulse clock to be input. If it is determined that the timer counter has overflowed, the WDT 111 resets the CPU 103 (step S67).

Figure 16:
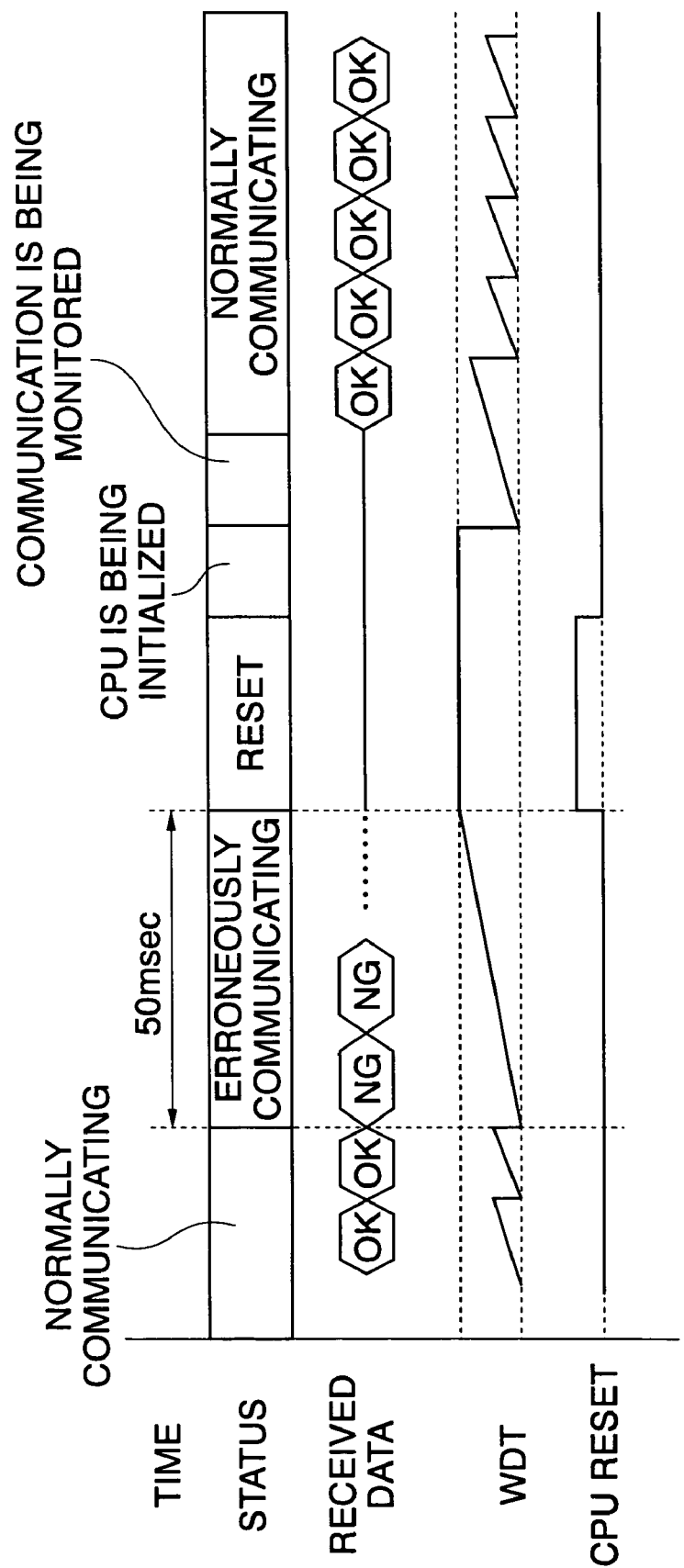
FIG. 16 is a time chart showing how resetting and overflow of the WDT and reset of the CPU of the automatic original feeder are carried out, and a state after the reset.

FIG. 16 is a time chart showing how resetting and overflow of the WDT 111 and reset of the CPU 103 are carried out, and a state after the reset of the CPU 103.

As described above with reference to FIG. 11, the timer counter of the WDT 111 is set in advance so as to overflow after the lapse of 50 ms, for example. Also as described with reference to FIG. 12, the time period required for one communication is approximately 1.65 ms. Therefore, during a time period indicated as "NORMALLY COMMUNICATING" in FIG. 16, even if the CPU 103 of the automatic original feeder 1 fails to receive the transmission data Tx due to a sudden external factor such as a noise, the CPU 103 is not reset because this failure is not a successive reception failure.

On the other hand, since the timer counter of the WDT 111 overflows after the lapse of 50 ms, for example, and one communication takes approximately 1.65 ms as mentioned above, if the CPU 103 fails to receive the transmission data Tx for successive 30 communications (≈0.50 ms÷1.65 ms), the CPU 103 is reset as indicated as time periods "ERRONEOUSLY COMMUNICATING" and "RESET" in FIG. 16, for example. It should be noted that the CPU 103 restores into a normally communicating state through initialization after being reset.

The above-described method of resetting the CPU 103 using the WDT 111 may be applied to initializing the automatic original feeder 1 as the slave by the imager reader 2 such that the image reader 2 as the master suspends the communication with the automatic original feeder 1 for 50 ms or more, or continuously transmits incorrect transmission data Tx (data with an incorrect checksum or parity data) to the automatic original feeder 1 for 30 or more of successive communications.

Although in the present embodiment, the watchdog timer measures the time period over which erroneous transmission is continued, alternatively a timer which can operate independently of the CPU 103 may be provided to reset the CPU 103 when the reception of the transmission data Tx by the CPU 103 continues to fail for a predetermined time period.

As described above, according to the communication control method of the present embodiment in which the transmission and the reception of the data carried out simultaneously in the master-slave arrangement, the watchdog timer is provided in the slave apparatus for monitoring the CPU of the slave apparatus. When the slave apparatus has normally received data through communication with the master apparatus, the CPU resets the count of the watchdog timer, and when the count reaches a predetermined value, the watchdog timer resets the CPU of the slave apparatus.

As a result, the CPU of the slave apparatus can recover by itself in the case of occurrence of a communication error, which makes it unnecessary to provide a reset control line or the like between the master apparatus and the slave apparatus.

Further, according to the present embodiment, the predetermined value which is a time period before the CPU of the slave apparatus is reset is set to a multiple of a time period of one communication between the master and the slave. As a result, it is possible to avoid the CPU of the slave apparatus from being initialized due to a sudden communication error caused by an external noise via the communication line or a like factor.

It should be noted that in the present embodiment as well, the apparatus that carries out the error determination and error notification and the processing of resetting the CPU may be reversed between the master and the slave. For example, the master apparatus may determine an error in the data transmitted from the slave apparatus.

It goes without saying that the object of the present invention may also be accomplished by supplying a system or an apparatus with a storage medium (or a recording medium) in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the novel functions of either of the present invention, and hence the program code and a storage medium on which the program code is stored constitute the present invention.

Further, examples of the storage medium for supplying the program code include a flexible disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the embodiments described above may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A communication system comprising:
   a first apparatus and a second apparatus that transmit and receive data simultaneously;
   an error determining device that is provided in said first apparatus and determines error of reception data;
   an adding device that is provided in said first apparatus and adds a result of the determination by said error determining device to transmission data being transmitted to said second apparatus; and
   a re-transmission determining device that is provided in said second apparatus and determines whether the data transmitted from said first apparatus is to be re-transmitted or not based on the determination result added to the transmission data.

2. A communication system as claimed in claim 1, wherein one of said first apparatus or said second apparatus acts as a master apparatus, and the other one of said first apparatus or said second apparatus acts as a slave apparatus.

3. A communication system as claimed in claim 1, further comprising a communication control device that is provided in said second apparatus and controls communication by said first apparatus.

4. A communication system as claimed in claim 1, wherein said error determining device determines error of the reception data based on a checksum included in the reception data.

5. A communication system as claimed in claim 1, wherein said error determining device determines error of the reception data based on parity data included in the reception data.

6. A communication system comprising:
   a first apparatus and a second apparatus that transmit and receive data simultaneously;

an error determining device that is provided in said first apparatus and determines error of reception data;

an adding device that is provided in said first apparatus and adds a result of the determination by said error determining device to transmission data being transmitted to said second apparatus; and a setting device that sets start timing of data transmission by said first apparatus and start timing of data transmission by said second apparatus coincident with each other, and sets a length of data transmitted by said second apparatus shorter than a length of data transmitted by said first apparatus.

7. A communication system comprising:

a first apparatus and a second apparatus that transmit and receive data simultaneously;

an error determining device that is provided in said first apparatus and determines error of reception data;

an adding device that is provided in said first apparatus and adds a result of the determination by said error determining device to transmission data being transmitted to said second apparatus;

a measuring device that is provided in said first apparatus and measures a time period over which said error determining device consecutively determines that the reception data is erroneous; and an initializing device that is provided in said first apparatus and initializes said first apparatus if the time period measured by said measuring device exceeds a predetermined time period.

8. A communication system as claimed in claim 7, wherein the predetermined time period is set to a multiple of a time period required for one of a plurality of periodic data transmissions.

9. A communication system as claimed in claim 7, wherein said measuring device and said initializing device comprise a watchdog timer.

10. A communication method for a communication system including a first apparatus and a second apparatus that transmit and receive data simultaneously, the method comprising:

an error determining step of causing the first apparatus to determine error of reception data;

an adding step of causing the first apparatus to add a result of the determination in said error determining step to transmission data being transmitted to the second apparatus; and a re-transmission determining step of determining in the second apparatus whether the data transmitted from the first apparatus is to be re-transmitted or not based on the determination result added to the transmission data.

11. A communication apparatus that transmits and receives data to and from a first apparatus simultaneously, the apparatus comprising:

an error determining device that determines error of reception data transmitted from the first apparatus;

an adding device that adds a result of the determination by said error determining device to transmission data being transmitted to the first apparatus;

a measuring device that is measures a time period over which said error determining device consecutively determines that the reception data is erroneous; and an initializing device that initializes said first apparatus if the time period measured by said measuring device exceeds a predetermined time period.

12. A communication apparatus as claimed in claim 11, wherein one of the first apparatus or the communication apparatus acts as a master apparatus, and the other one of the first apparatus or the communication apparatus acts as a slave apparatus.

13. A communication apparatus as claimed in claim 11, wherein said error determining device determines error of the reception data based on a checksum included in the reception data.

14. A communication apparatus as claimed in claim 11, wherein said error determining device determines error of the reception data based on parity data included in the reception data.

15. A communication apparatus as claimed in claim 11, wherein the predetermined time period is set to a multiple of a time period required for one of a plurality of periodic data transmissions.

16. A communication apparatus as claimed in claim 11, wherein said measuring device and said initializing device comprise a watchdog timer.

17. A communication apparatus that transmits and receives data to and from a first apparatus simultaneously, the apparatus comprising:

an error determining device that determines error of reception data transmitted from the first apparatus;

an adding device that adds a result of the determination by said error determining device to transmission data being transmitted to the first apparatus; and a setting device that sets start timing of data transmission by the first apparatus and start timing of data transmission by the communication apparatus coincident with each other, and sets a length of data transmitted by the communication apparatus shorter than a length of data transmitted by the first apparatus.

18. A communication apparatus that transmits and receives data to and from a first apparatus simultaneously, comprising:

a transmitting device that transmits data to the first apparatus;

a receiving device that receives data from the first apparatus in parallel with data transmission by said transmitting device; and a determining device that determines error of data transmitted through an Nth transmission by said transmitting device based on reception data, reception of which is started simultaneously with the Nth transmission.

19. A communication apparatus as claimed in claim 18, further comprising a re-transmitting device that re-transmits the data transmitted through the Nth transmission through an N+1th transmission based on a result of the determination by said determining device.

20. A communication method for a communication apparatus that transmits and receives data to and from a first apparatus simultaneously, comprising:

a transmitting step of transmitting data to the first apparatus;

a receiving step of receiving data from the first apparatus in parallel with data transmission in said transmitting step; and a determining step of determining error of data transmitted through an Nth transmission in said transmitting step based on reception data, reception of which is started simultaneously with the Nth transmission.

21. A communication method for a communication system including a first apparatus and a second apparatus that transmit and receive data simultaneously, the method comprising:

an error determining step of causing the first apparatus to determine error of reception data;

an adding step of causing the first apparatus to add a result of the determination in said error determining step to transmission data being transmitted to the second apparatus; and a setting step of setting start timing of data transmission by the first apparatus and start timing of data transmission by the second apparatus coincident with each other, and setting a length of data transmitted by the second apparatus shorter than a length of data transmitted by the first apparatus.

* * * * *